(12) United States Patent
Saito

(10) Patent No.: US 12,025,804 B2
(45) Date of Patent: Jul. 2, 2024

(54) VIRTUAL IMAGE DISPLAY DEVICE AND OPTICAL UNIT

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 510 days.

(21) Appl. No.: 17/459,673

(22) Filed: Aug. 27, 2021

(65) Prior Publication Data

US 2022/0066218 A1 Mar. 3, 2022

(30) Foreign Application Priority Data

Aug. 28, 2020 (JP) .................................. 2020-144251

(51) Int. Cl.
*G02B 27/01* (2006.01)
*G02B 5/00* (2006.01)
*G02B 5/10* (2006.01)
*G02B 5/18* (2006.01)

(52) U.S. Cl.
CPC ......... *G02B 27/0172* (2013.01); *G02B 5/003* (2013.01); *G02B 5/10* (2013.01); *G02B 5/1861* (2013.01); *G02B 2027/0178* (2013.01)

(58) Field of Classification Search
CPC ...... G02B 27/0172; G02B 5/003; G02B 5/10; G02B 5/1861; G02B 2027/0178; G02B 27/4272; G02B 2027/0174; G02B 17/02; G02B 17/026; G02B 1/06; G02B 17/0856; G02B 27/4277
See application file for complete search history.

(56) References Cited

U.S. PATENT DOCUMENTS

| 6,396,639 | B1 * | 5/2002 | Togino | G02B 17/0816 |
| | | | | 359/640 |
| 6,512,635 | B1 * | 1/2003 | Takeyama | G02B 27/0172 |
| | | | | 359/638 |
| 9,459,455 | B2 * | 10/2016 | Cakmakci | G02B 27/0172 |
| 11,546,575 | B2 * | 1/2023 | Hua | G06T 15/20 |
| 2020/0018966 | A1 | 1/2020 | Komatsu et al. | |
| 2021/0181508 | A1 * | 6/2021 | Tu | G02B 27/0172 |

FOREIGN PATENT DOCUMENTS

| JP | H06-059217 A | 3/1994 |
| JP | 2016-085427 A | 5/2016 |
| JP | 2020-008749 A | 1/2020 |

* cited by examiner

*Primary Examiner* — Darryl J Collins
*Assistant Examiner* — Matthew Y Lee
(74) *Attorney, Agent, or Firm* — Oliff PLC

(57) ABSTRACT

A virtual image display device includes an imaging light generation device that generates an imaging light, a first reflection type diffraction element that diffracts the imaging light from the imaging light generation device, a second reflection type diffraction element diffracts the imaging light from the first reflection type diffraction element so that the imaging light reflected by the first reflection type diffraction element is compensated for wavelength distribution, and a concave transmission mirror that has a concave shape and includes a partial reflection film reflecting a part of the imaging light and transmitting other part of the imaging light. In the second reflection type diffraction element diffracts the imaging light toward the mirror and transmits the part of the imaging light reflected by the mirror.

15 Claims, 14 Drawing Sheets

VIRTUAL IMAGE DISPLAY DEVICE AND OPTICAL UNIT

The present application is based on, and claims priority from JP Application Serial Number 2020-144251, filed Aug. 28, 2020, the disclosure of which is hereby incorporated by reference herein in its entirety.

BACKGROUND

1. Technical Field

The present disclosure relates to a see-through type virtual image display device and an optical unit, and particularly relates to a type of a virtual image display device and an optical unit that allow imaging light to enter a concave transmission mirror and observe reflected light from the concave transmission mirror.

2. Related Art

As a virtual image display device, a so-called bird bath type device including a transmissive reflection surface and a concave transmission mirror is known (see JP-A-2020-008749). JP-A-2020-008749 describes a feature wherein the imaging light incident on a prism member provided with the transmissive reflection surface is guided by total internal reflection toward the transmissive reflection surface on the total reflection surface of the prism member, as well as the imaging light is reflected by the transmissive reflection surface toward the concave transmission mirror disposed in front of the prism member.

In the virtual image display device of JP-A-2020-008749, in order to ensure see-through property, it is necessary to make the total reflection surface on an external side and a facing surface on a user side of the prism member in which two prisms are bonded parallel to each other, which may make the optical system heavy.

SUMMARY

A virtual image display device according to an aspect of the present disclosure includes an imaging light generation device that generates an imaging light, a first reflection type diffraction element diffracts the imaging light from the imaging light generation device, a second reflection type diffraction element configured to diffract the imaging light from the first reflection type diffraction element so that the imaging light reflected by the first reflection type diffraction element is compensated for wavelength distribution, and a concave transmission mirror that has a concave shape and that includes a partial reflection film reflecting a part of the imaging light and transmitting other part of the imaging light. In the second reflection type diffraction element diffracts the imaging light toward the mirror and is transmits the part of the imaging light reflected by the mirror.

DESCRIPTION OF EXEMPLARY EMBODIMENTS

First Exemplary Embodiment

Hereinafter, a virtual image display device according to a first embodiment of the present disclosure and an optical unit incorporated therein will be described with reference to FIGS. 1 to 4, etc.

Figure 1:
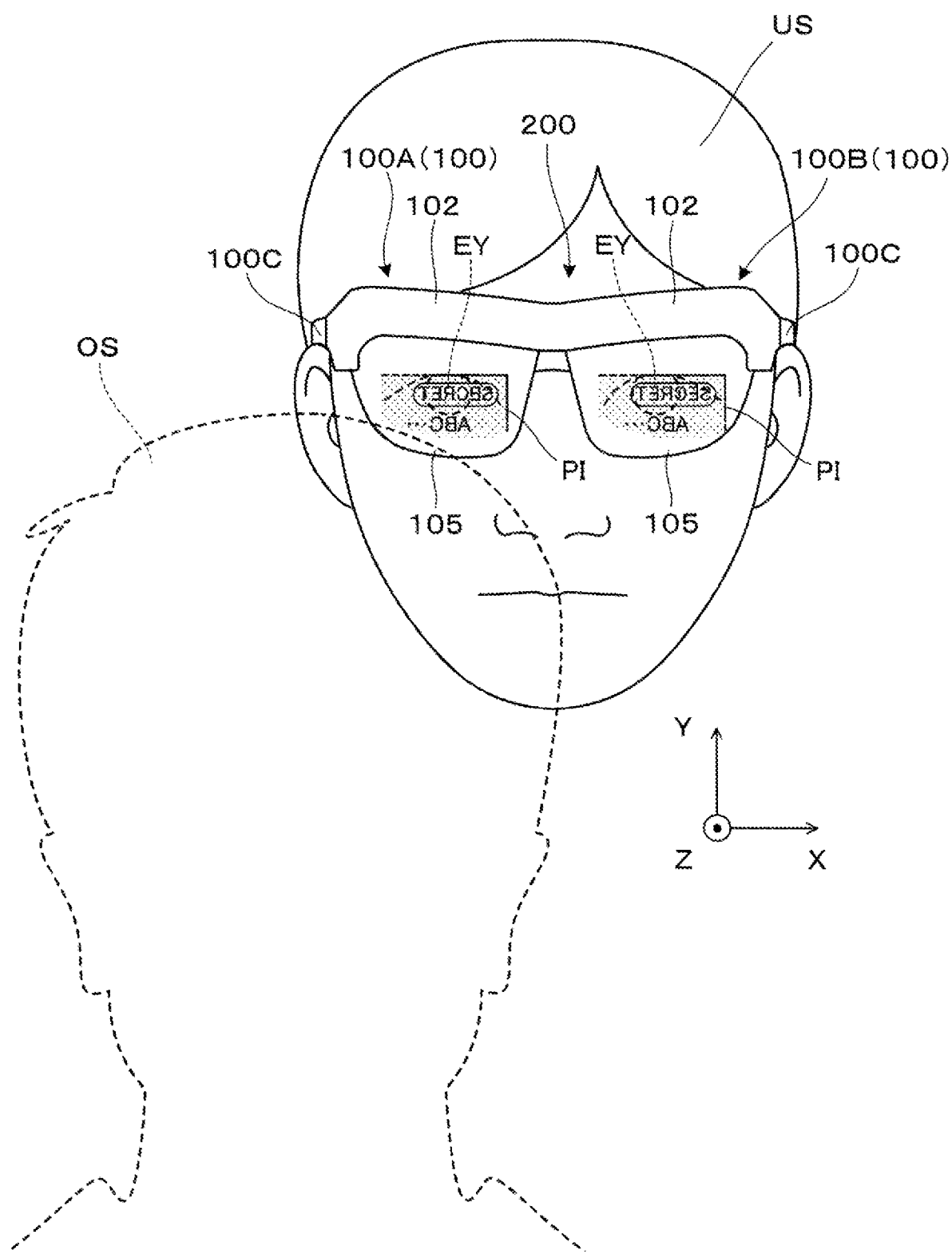
FIG. 1 is an external view illustrating a mounted state of a virtual image display device of a first exemplary embodiment.

FIG. 1 is a diagram illustrating a mounting state of a head-mounted display (hereinafter, also referred to as "HMD") 200. The HMD 200 causes an observer or wearer US wearing the HMD 200 to recognize an image as a virtual image. In FIG. 1, etc., X, Y, and Z are an orthogonal coordinate system, where an X direction corresponds to a lateral direction in which both eyes EY of the observer or wearer US wearing the HMD 200 or the virtual image display device 100 are aligned, a Y direction corresponds to an upward direction orthogonal to the lateral direction in which both eyes EY of the wearer US are aligned, and a Z direction corresponds to a front direction of the wearer US or a front face direction. The ±Y direction is parallel to a vertical axis or a vertical direction.

The HMD 200 includes a first display device 100A for the right eye, a second display device 100B for the left eye, and a pair of temple support devices 100C for supporting the display devices 100A and 100B. The first display device 100A includes a display driving unit 102 disposed at an upper portion, and an appearance member 105 that has a spectacle lens shape and covers the front of the eye. Similarly, the second display device 100B includes a display driving unit 102 disposed at an upper portion, and an appearance member 105 that has a spectacle lens shape and covers the front of the eye. The support device 100C supports a top end side of the appearance member 105 via the display driving unit 102. The first display device 100A and the second display device 100B are optically inverted from left to right. Hereinafter, the first display device 100A for the right eye will be described as the representative virtual image display device 100.

A virtual image display device 100, which is the display device 100A for the right eye, will be described with reference to FIG. 2. The virtual image display device 100 includes an imaging light generation device 11, an optical unit 12, and a display control circuit 13. However, in the present specification, a device excluding the display control circuit 13 is also referred to as a virtual image display device 100 in terms of achieving optical functions. The imaging light generation device 11 and the display control circuit 13 are supported within an outer frame of the display driving unit 102 illustrated in FIG. 1. A portion of the optical unit 12 is also supported within the outer frame of the display driving unit 102.

The imaging light generation device 11 is a self-emitting display device. The imaging light generation device 11 is, for example, an organic EL (Organic Electro-Luminescence) display, and forms a color still image or a moving image on a two-dimensional display surface 11a. The imaging light generation device 11 is driven by the display control circuit 13 to perform display operation. The imaging light generation device 11 is not limited to organic EL displays, and can be replaced with display devices using inorganic EL, LED arrays, organic LEDs, etc. The imaging light generation device 11 is not limited to the self-emitting imaging light generation device, and may include an LCD or another light modulating element, and may form an image by illuminating the light modulating element with a light source such as a backlight. As the imaging light generation device 11, a LCOS (Liquid crystal on silicon, where LCoS is a registered trademark), a digital micro-mirror device, etc. may be used instead of the LCD.

The optical unit 12 is an imaging system including a projection lens 21, a first diffraction device 22, a second diffraction device 23, and a concave transmission mirror 24. The optical unit 12 forms a virtual image with imaging light ML emitted from the imaging light generation device 11. In the optical unit 12, an optical path from the imaging light generation device 11 to the first diffraction device 22 is located on the upper side of an optical path from the second diffraction device 23 to the concave transmission mirror 24. In other words, by the first diffraction device 22 and the second diffraction device 23, an optical path that is virtually developed outside the first diffraction device 22 from an optical path OP1 on the imaging light generation device 11 side that faces the first diffraction device 22, is set in the −Z direction parallel to the optical axis AX while being shifted in the −Y direction perpendicular the optical axis AX so that the optical path faces the second diffraction device 23, which is referred to as an optical path OP2 on the concave transmission mirror 24 side.

The projection lens 21 is held within the outer frame of the display driving unit 102 illustrated in FIG. 1. The projection lens 21 enters the imaging light ML into the first diffraction device 22 while converging the imaging light ML emitted from the imaging light generation device 11 to form a virtual image with the imaging light ML. Although detailed explanation is omitted, the projection lens 21 may include one or more lenses and includes a spherical lens or an aspheric lens, but may also include a free-form lens.

The first diffraction device 22 is held within the outer frame of the display driving unit 102 illustrated in FIG. 1. The first diffraction device 22 causes the imaging light ML from the imaging light generation device 11 that has been transmitted through the projection lens 21 to be parallel at each position in the vertical direction, and to be bent downward and rearward diagonally. Here, the first diffraction device 22 includes a first reflection type diffraction element D1 and a light-absorbing member 22c.

The first reflection type diffraction element D1 is formed as a reflection type diffraction layer 22b at an inner side surface 22r of a plate shaped body 22a having optical transparency. Here, "inner" means a side of an exit pupil EP. The first reflection type diffraction element D1 uniformly diffracts the imaging light ML in the vertical Y direction, which is a predetermined direction. Specifically, when viewed in a cross section parallel to the YZ plane extending in the vertical direction, the first reflection type diffraction element D1 causes the imaging light ML emitted from each position on the imaging light generation device 11 to be uniformly parallel at each position in the vertical direction by diffraction using a wavelength shift in a wavelength region of each color, and to be bent downward and rearward diagonally. At this time, each color light constituting the imaging light ML is bent downward and rearward diagonally as well. The first reflection type diffraction element D1 diffracts the imaging light ML similarly at the same diffraction angle at the same height position in the first reflection type diffraction element D1, that is, at each position in the lateral direction where the Y coordinate values are the same. The first reflection type diffraction element D1 does not have a diffraction effect with respect to the left-right or horizontal X direction orthogonal to the vertical Y direction.

Figure 3:
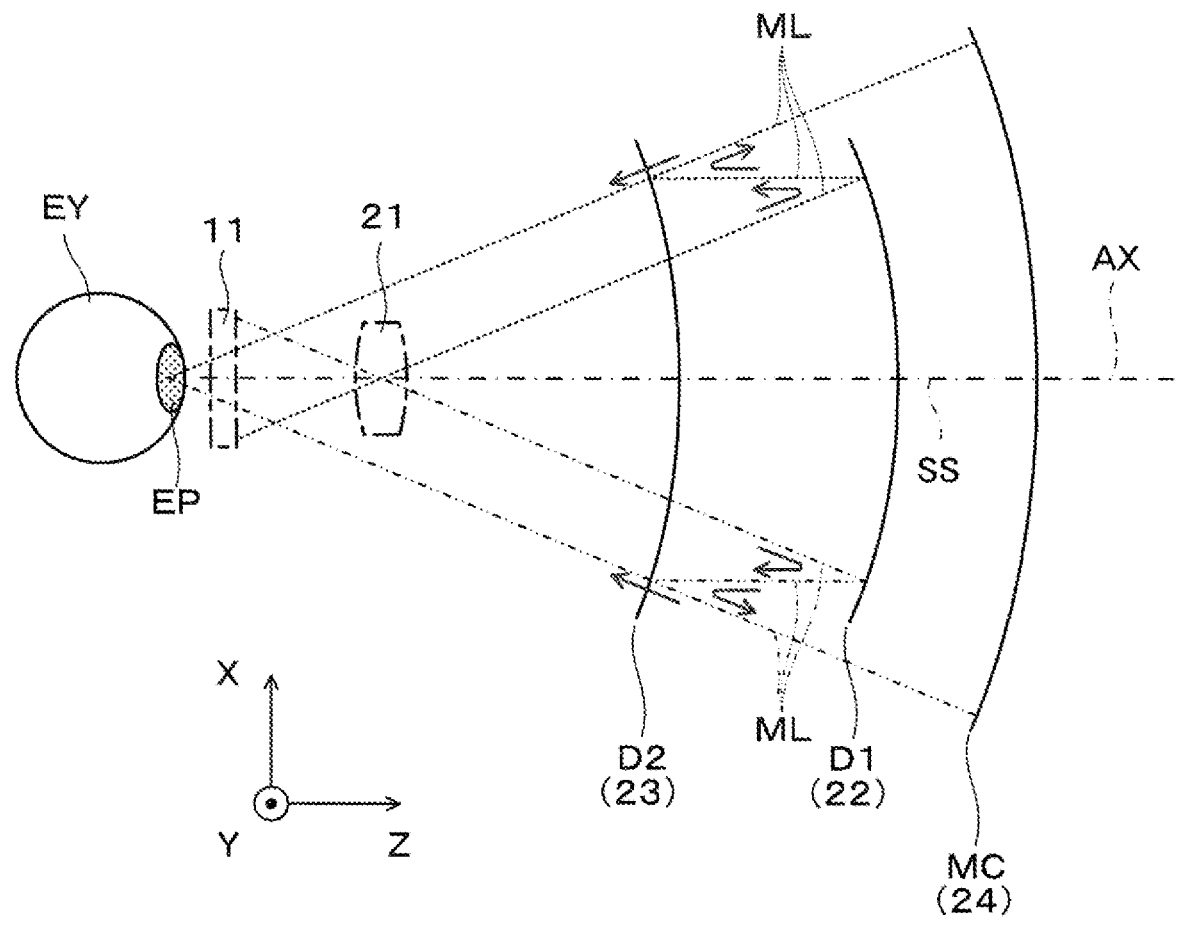
FIG. 3 is a flat surface cross-sectional view illustrating the virtual image display device of FIG. 1.

Referring to FIG. 3, the first reflection type diffraction element D1 is formed along a cylindrical surface that curves to be concave toward an inner exit pupil EP. When projected in the left-right X direction, that is, in a cross section parallel to the horizontally extending XZ plane, the first reflection type diffraction element D1 reflects the imaging light ML emitted as a main light ray from each position in the lateral direction of the imaging light generation device 11 to be a light ray parallel to the optical axis AX or Z direction.

Referring back to FIG. 2, the light-absorbing member 22c is provided to be attached to an outer side surface 22f of the plate shaped body 22a. In other words, the light-absorbing member 22c is disposed on the back surface side of the first reflection type diffraction element D1. The light-absorbing member 22c is formed of a material including a light-absorbing material such as carbon black, and absorbs the imaging light ML that has not been diffracted by the first reflection type diffraction element D1 but has been transmitted through the first reflection type diffraction element D1. Note that an antireflection film can be formed at the surface of the first reflection type diffraction element D1.

The second diffraction device 23 is fixed directly or indirectly to the outer frame of the display driving unit 102 illustrated in FIG. 1. The second diffraction device 23 returns the imaging light ML from the first diffraction device 22 back to have an angular state prior to being incident on the first diffraction device 22, and bends the imaging light ML forward. Here, the second diffraction device 23 includes a second reflection type diffraction element D2.

The second reflection type diffraction element D2 is formed as a reflection type diffraction layer 23b at an outer side surface 23f of the plate shaped body 23a having optical transparency. Here, "outer" means an external side where there is no exit pupil EP. The second reflection type diffraction element D2 uniformly diffracts the imaging light ML in the vertical Y direction, which is a predetermined direction. Specifically, when viewed in a cross section parallel to the YZ plane extending in the vertical direction, the first reflection type diffraction element D1 returns the imaging light ML emitted from each position on the first reflection type diffraction element D1 and incident on each corresponding position of the second reflection type diffraction element D2 back to have an angular state prior to being incident on the first reflection type diffraction element D1 by diffraction using the wavelength shift in the wavelength region of each color, and bends the imaging light ML forward. In other words, the second reflection type diffraction element D2 diffracts the imaging light ML at an exit angle Go such that an incident angle θi on the first reflection type diffraction element D1 is restored. At this time, each color light constituting the imaging light ML is bent forward as well. The second reflection type diffraction element D2 diffracts the imaging light ML similarly at the same diffraction angle at the same height position in the second reflection type diffraction element D2, that is, at each position in the lateral direction where the Y coordinate values are the same. The second reflection type diffraction element D2 does not have a diffraction effect with respect to the left-right or horizontal X direction.

Referring to FIG. 3, the second reflection type diffraction element D2 is formed along a cylindrical surface that curves to be convex toward the outside (opposite the exit pupil EP). This means that the first reflection type diffraction element D1 and the second reflection type diffraction element D2 have different refractive powers with different signs in the left-right X direction, which is an intersecting direction orthogonal to the predetermined direction. When projected in the left-right or lateral X direction, that is, in a cross section parallel to the horizontally extending XZ plane, the second reflection type diffraction element D2 returns the imaging light ML emitted as a main light ray from each position in the lateral direction of the imaging light generation device 11, which corresponds to a light ray parallel to the optical axis AX or Z direction when viewed from above through the first reflection type diffraction element D1, back to have an original angular state prior to being incident on the first reflection type diffraction element D1 upon emitted from the second reflection type diffraction element D2.

Referring back to FIG. 2, an antireflection film 23c is formed at an inner side surface 23r of the plate shaped body 23a.

Figure 4:
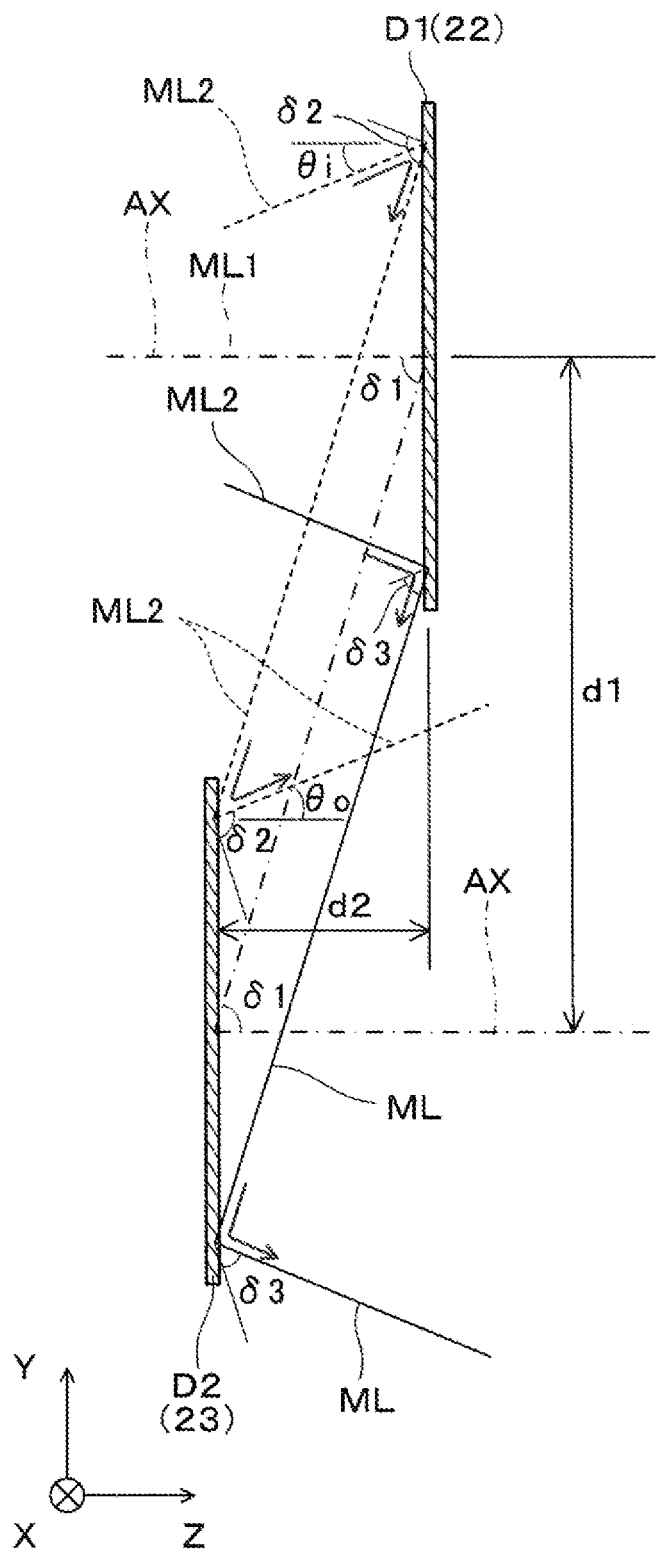
FIG. 4 is a side cross-sectional view illustrating a first reflection type diffraction element and a second reflection type diffraction element.

Referring to FIG. 4, the first reflection type diffraction element D1 reflects imaging light ML1 (indicated by a single dot-dash line in common with the optical axis AX) incident on a center portion thereof at an angle δ1 with respect to an angular direction corresponding to specular reflection. In addition, the first reflection type diffraction element D1 reflects the imaging light ML2 incident on an upper portion thereof (indicated by the dashed line) at an angle δ2 with respect to an angular direction corresponding to the specular reflection. Furthermore, the first reflection type diffraction element D1 reflects the imaging light ML3 (indicated by the solid line) incident on a lower portion thereof at an angle δ3 with respect to an angular direction corresponding to the specular reflection. Here, the angles δ1, δ2, and δ3 have a relation of

δ2>δ1>δ3.

In this relation, an angular difference is generated due to color dispersion of the first reflection type diffraction element D1.

Figure 5:
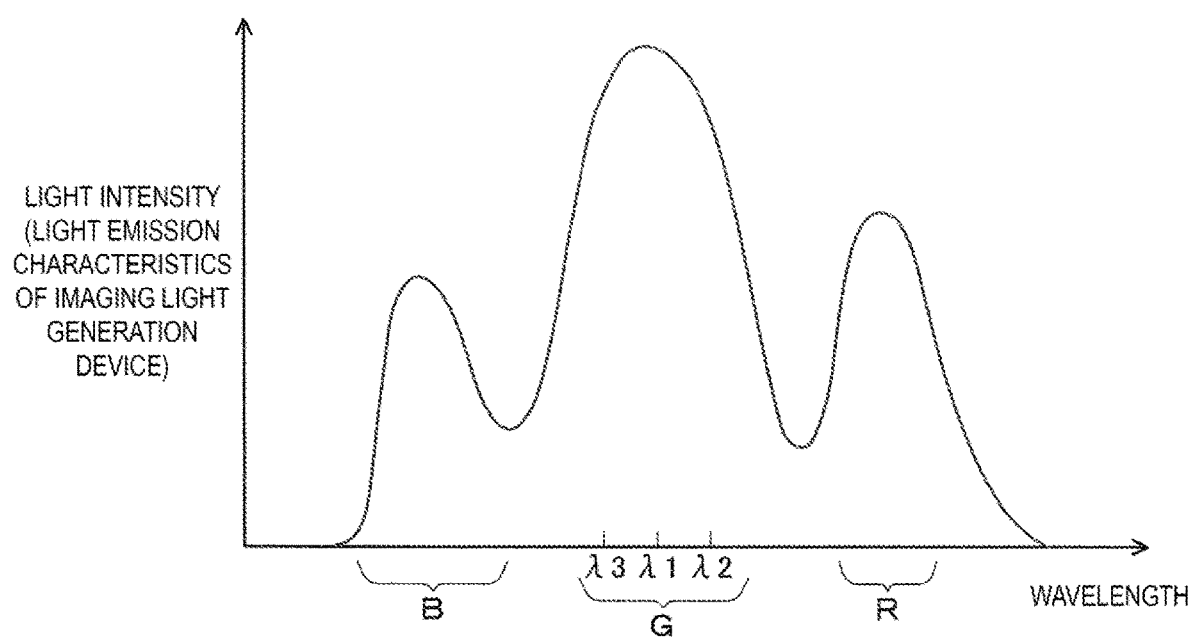
FIG. 5 is a diagram illustrating a wavelength distribution of imaging light emitted from an imaging light generation device.

FIG. 5 is a conceptual chart illustrating light emission characteristics of the imaging light generation device 11, that is, wavelength characteristics of the imaging light ML. In this chart, the horizontal axis indicates the wavelength and the vertical axis indicates the light intensity (arbitrary units). The wavelength characteristic of the imaging light ML has a peak of light intensity in the wavelength region of blue B light, green G light, and red R light. In other words, the imaging light generation device 11 forms the imaging light ML that includes three colors. Further, focusing on the G light, a wavelength region of the G light has a constant width and has wavelength elements λ1, λ2, λ3. Here, the wavelength elements λ1, λ2, λ3 have a relation of

λ2>λ1>λ3.

Returning to FIG. 4, in the first reflection type diffraction element D1, the angles 51, 52, 53 at which the imaging light ML1, ML2, and ML3 are diffracted correspond to the wavelength elements λ1, λ2, and λ3 illustrated in FIG. 5, and reflect the color dispersion. As a result, the imaging light ML1, ML2, and ML3 can be emitted in directions parallel to each other. In other words, in accordance with a position of the imaging light generation device 11 or the display surface 11a thereof in the vertical Y direction, the first reflection type diffraction element D1 reflects the imaging light ML1, ML2, and ML3 so that incident light that is incident on the first reflection type diffraction element D1 reflects the wavelength shift to be mutually parallel exit light. In this case, the wavelength utilized at the position in the vertical direction of the display surface 11a of the imaging light generation device 11 is different, thus the wavelength shift occurs in the vertical direction in an image displayed as a virtual image when the entire display surface 11a is considered. However, the wavelength shift in the virtual image is at most λ2-λ3, and all of the imaging light ML1, ML2, and ML3 are G light, thus substantial color unevenness does not occur. Even if it is found that the effect on the image due to the wavelength shift λ2-λ3 is not negligible, by adjusting the light emission intensity and the emission time for each pixel constituting the display surface 11a, color correction balanced with respect to the color triangle in the color gamut can be available, whereby the effects of color unevenness, etc. can be suppressed.

The second reflection type diffraction element D2 has a structure in which the first reflection type diffraction element D1 is inverted with respect to a plane parallel to the XY plane. For example, as illustrated in FIG. 4, on a reference plane SS (see FIG. 3) in which the optical axis AX is parallel to the YZ plane, the first reflection type diffraction element D1 and the second reflection type diffraction element D2 are disposed in parallel and have structures that are inverted to each other with respect to the Z-axis. As a result, the second reflection type diffraction element D2 diffracts the imaging light ML from the first reflection type diffraction element D1 with respect to the vertical Y direction so that the imaging light ML is compensated for wavelength distribution. As a result, the imaging light ML1, which is incident on the center of the second reflection type diffraction element D2 through the center of the first reflection type diffraction element D1, is diffracted again at the angle δ1 and emitted in a direction parallel to the optical axis AX. The imaging light ML2, which is incident on the top of the second reflection type diffraction element D2 through the upper portion of the first reflection type diffraction element D1, is diffracted again at the angle δ2 and returned to have the angular state prior to being incident on the first reflection type diffraction element D1. The imaging light ML3, which is incident on the lower portion of the second reflection type diffraction element D2 through the lower portion of the first reflection type diffraction element D1, is diffracted again at the angle δ3 and returned to have the angular state prior to being incident on the first reflection type diffraction element D1. In other words, by passing through the first reflection type diffraction element D1 and the second reflection type diffraction element D2, the angle of the imaging light ML is stored in the vertical Y direction, and the angle of the imaging light ML is also stored in the left-right X direction as is clear from FIG. 3. At this time, the optical axis AX shifts downward by a difference d1 in the vertical position between the first reflection type diffraction element D1 and the second reflection type diffraction element D2. The optical axis AX shifts inward by a difference d2 in the front and rear position between the first reflection type diffraction element D1 and the second reflection type diffraction element D2. Note that the second reflection type diffraction element D2 has higher transparency than the first reflection type diffraction element D1, and partially transmits the imaging light ML.

Returning to FIG. 2, the concave transmission mirror 24 is an optical member having a concave shape in the vertical direction and the left-right direction toward the exit pupil EP. The word of transmission in the concave transmission mirror 24 means that light is partially transmitted. The concave transmission mirror 24 has a light convergence function as a function for forming a virtual image, and partially reflects and collimates the imaging light ML, which is reflected by diffraction from the second diffraction device 23 and travels forward while being diverged by the partial reflection film 24b provided inside. The imaging light ML is returned to the second diffraction device 23 by the concave transmission mirror 24, and is partially transmitted through the second diffraction device 23 and is collected into the exit pupil EP. That is, by the partial reflection film 24b that is a partial reflection surface MC concave inside, the concave transmission mirror 24 partially reflects the imaging light ML that is diffracted from the second diffraction device 23 including the second reflection type diffraction element D2 and travels forward, toward the second diffraction device 23 that includes the second reflection type diffraction element D2, and folds the imaging light ML backwards. The concave transmission mirror 24 then collects the imaging light ML after folding back into the exit pupil EP while performing collimation. At this time, the imaging light ML is incident from a direction close to normal to the entire portion of a partial reflection surface MC of the concave transmission mirror 24, and then reflected, whereby the optical symmetry thereof is high.

A plate shaped body 24a of the concave transmission mirror 24 has a uniform thickness while being curved. The plate shaped body 24a has transparency that allows light to be transmitted substantially without loss. A metal film or a dielectric multilayer film is formed as a partial reflection film 24b at an inner side surface 24r of the plate shaped body 24a. Such a partial reflection film 24b functions as a concave partial reflection surface MC that partially reflects the imaging light ML incident from a side of the second diffraction device 23. The reflectance and transmittance of the partial reflection surface MC are set to, for example, approximately 20~50%. The partial reflection surface MC not only collects the imaging light ML into the exit pupil EP while performing the collimation by reflection, but also ensures optical transparency of the concave transmission mirror 24 with respect to external light OL etc. A reflection type diffraction layer that 24c diffracts the imaging light ML is formed at an outer side surface 24f of the plate shaped body 24a. The reflection type diffraction layer 24c functions as a third reflection type diffraction element D3 for preventing the imaging light ML from leaking to an external environment. The third reflection type diffraction element D3 ensures partial transparency of the concave transmission mirror 24 to the external light OL, while ensuring the blocking property of the concave transmission mirror 24 to the imaging light ML. The third reflection type diffraction element D3 exerts functions thereof by being disposed on the external side of the partial reflection film 24b that forms the partial reflection surface MC. Here, the third reflection type diffraction element D3 is formed as part of the concave transmission mirror 24 so that a surface on the external side of the concave transmission mirror 24 is formed. In this case, a number of parts can be reduced and an increase in the weight and price of the device can be suppressed. Note that an antireflection film can be formed at the surface of the third reflection type diffraction element D3.

The partial reflection surface MC may be a free curved surface, while it is easy to have the target reflection characteristics of the partial reflection surface MC by providing an axisymmetric curved surface such as a spherical surface or an aspheric surface.

The concave transmission mirror 24 is incorporated to constitute a portion of the transmissive appearance member 105 illustrated in FIG. 1. In other words, by providing a plate member having transparency or not having transparency to the periphery of the concave transmission mirror 24, the appearance member 105 including the concave transmission mirror 24 can be provided. The appearance member 105 is not limited to a spectacle lens shape, and can have various contours or appearance.

The concave transmission mirror 24 or plate shaped body 24a preferably has a thickness of 1 mm or greater in order to ensure shape strength, but preferably has a thickness of 2 mm or less in terms of weight reduction. The plate shaped body 24a is formed from a resin material having optical transparency, for example, by injection molding.

In describing the optical path, the imaging light ML from the imaging light generation device 11 is incident on the first diffraction device 22 via the projection lens 21, is reflected by diffraction from the first reflection type diffraction element D1. Then, the imaging light ML is incident on the second diffraction device 23, is again reflected by diffraction from the second reflection type diffraction element D2, and is returned to have the original angular state. The imaging light ML emitted from the second diffraction device 23 is incident on the concave transmission mirror 24 and is reflected by the partial reflection surface MC, for example, at a reflectance of approximately 50% or less. The imaging light ML reflected by the concave transmission mirror 24 is transmitted through the second diffraction device 23 with a transmittance of, for example, about 50%, and is incident on the exit pupil EP on which the eye EY or the pupil of the wearer US is located. Here, the exit pupil EP is an eye point of the optical unit 12 assuming that the eye EY is located. Light from each point of the display surface 11a of the imaging light generation device 11 is incident to be collected at a certain point of the exit pupil EP at an angle that allows for the observation of the virtual image. The external light OL passing through the concave transmission mirror 24 is also incident on the exit pupil EP. In other words, the wearer US wearing the HMD 200 can observe the virtual image with the imaging light ML by overlaying the virtual image on the external image.

Note that if the concave transmission mirror 24 is not provided with the third reflection type diffraction element D3, or if a wavelength width of the component light of each color constituting the imaging light ML is too wide, the imaging light ML is not diffracted by the concave transmission mirror 24 and the imaging light ML is partially transmitted, which may generate passing light LP in front of the concave transmission mirror 24. If the intensity of the passing light LP is large, a third party OS present around the wearer US can observe a portion PI of the image displayed on the display surface 11a of the imaging light generation device 11 (see FIG. 1). In contrast, in the present exemplary embodiment, as described below, in the concave transmission mirror 24, the third reflection type diffraction element D3 is provided on the external side of the partial reflection film 24b to suppress the generation of the passing light LP, whereby the portion PI of the image is prevented from becoming observable by the third party OS.

Figure 6A:
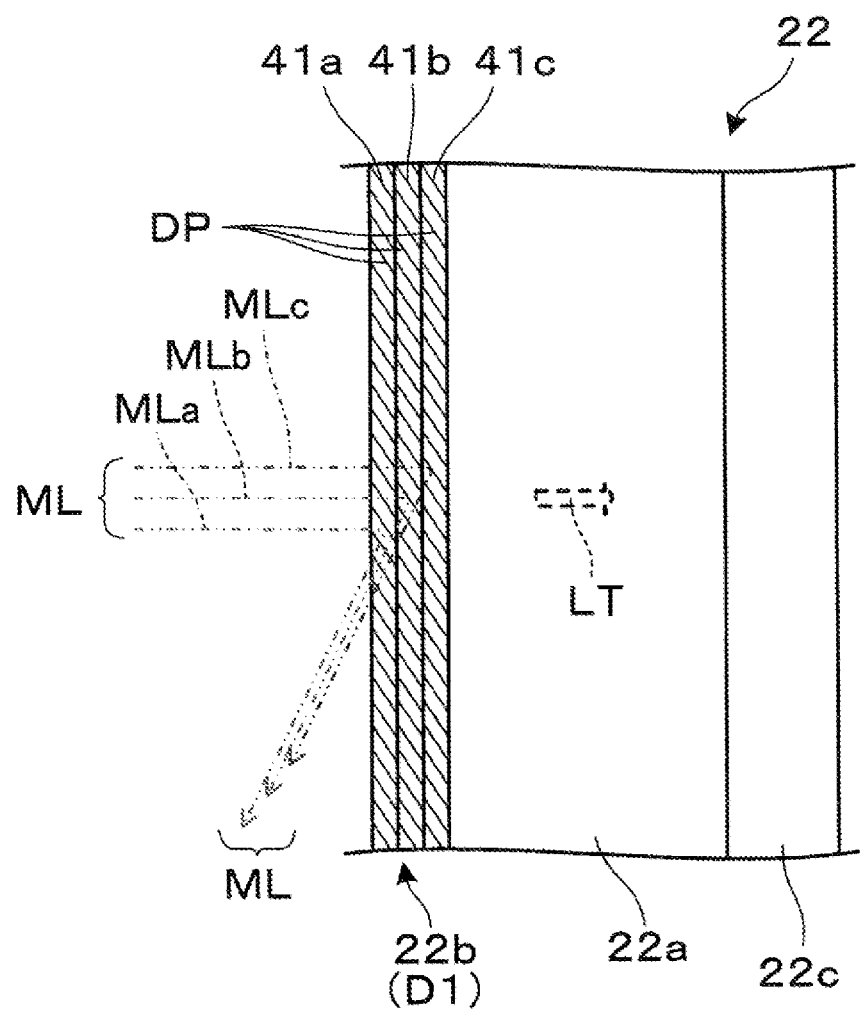
FIG. 6A is a diagram illustrating a structure of a first diffraction device including the first reflection type diffraction element.

A specific cross-sectional structure of the first diffraction device 22 will be described with reference to FIG. 6A. The first reflection type diffraction element D1 or the reflection type diffraction layer 22b includes an R diffraction layer 41a that diffracts red R light, a G diffraction layer 41b that diffracts green G light, and a B diffraction layer 41c that diffracts blue B light as the three diffraction elements corresponding to the three colors. The R diffraction layer 41a diffracts the R component MLa of the imaging light ML, and forms a red wavelength region of the imaging light ML emitted in the downward direction. The G diffraction layer 41b diffracts the G component MLb of the imaging light ML, and forms a green wavelength region of the imaging light ML emitted in the downward direction. The B diffraction layer 41c diffracts the B component MLc of the imaging light ML, and forms a blue wavelength region of the imaging light ML emitted in the downward direction. At this time, each of the RGB colors is diffracted in parallel with each other. The first reflection type diffraction element D1 includes the diffraction layers 41a, 41b, and 41c for three colors, whereby diffraction efficiency for each three colors can be increased, and loss in the first reflection type diffraction element D1 can be suppressed. Although not illustrated in the drawings, as a result of being reflected at different diffraction angles at each position in the vertical direction of the first reflection type diffraction element D1, each of the RGB light rays, which yields the color dispersion described in FIG. 4, is emitted in parallel in the same direction from each position in the vertical direction of the first reflection type diffraction element D1.

The R diffraction layer 41a, the G diffraction layer 41b, and the B diffraction layer 41c are reflection type diffraction elements, respectively. They are individually manufactured as film-shaped optical elements, joined to each other and laminated, and attached to the inner side surface of the plate shaped body 22a as a whole. Each of the diffraction layers 41a, 41b, and 41c is, for example, a volume hologram element. Each of the diffraction layers 41a, 41b, and 41c has a diffraction pattern DP extending in the left-right X direction that is an intersecting direction orthogonal to the predetermined direction. A pitch of the diffraction pattern DP at the surface is constant with respect to the vertical Y direction, which is the predetermined direction. However, in order to diffract each of the RGB colors at the same angle, the pitch of the diffraction pattern DP is set to a different value for each diffraction layer 41a, 41b, and 41c. When each of the diffraction layers 41a, 41b, and 41c is a volume hologram element, the first reflection type diffraction element D1 or the reflection type diffraction layer 22b includes three diffraction layers 41a, 41b, 41c as three volume hologram layers corresponding to the three colors. In this case, the diffraction layers 41a, 41b, and 41c are produced by a technique such as irradiating a film shaped storage material with object light and reference light to interfere with each other in the storage material for exposure and recording.

The first reflection type diffraction element D1 need not have a three-layer structure including the R diffraction layer 41a, the G diffraction layer 41b, and the B diffraction layer 41c, but may be an element in which stripes that diffract the imaging light ML for each color of RGB may be collectively formed in a single layer.

Note that the first reflection type diffraction element D1 need not be formed directly at the plate shaped body 22a or directly affixed thereon. For example, the plate shaped body 22a may be coated with a hard coat film, and the reflection type diffraction layer 22b as the first reflection type diffraction element D1 may be formed or affixed thereon. Furthermore, the first reflection type diffraction element D1 may be embedded in the plate shaped body 22a.

Transmitted light LT, which is the imaging light ML that travels without being diffracted by the first reflection type diffraction element D1, is incident on the light-absorbing member 22c via the plate shaped body 22a, but is completely absorbed by the light-absorbing member 22c and does not leak out. In other words, by the light-absorbing member 22c, the transmitted light that that has not diffracted by the first reflection type diffraction element D1 can be prevented from being emitted to the external side.

Figure 6B:
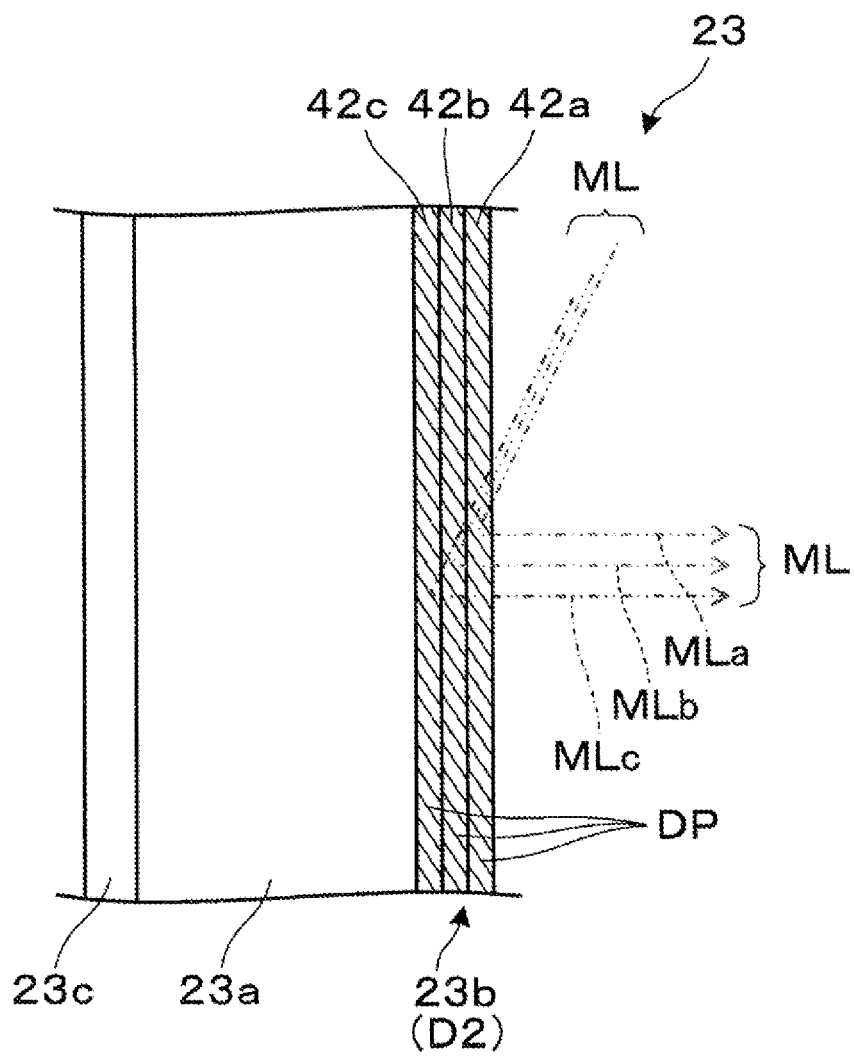
FIG. 6B is a diagram illustrating a structure of a second diffraction device including the second reflection type diffraction element.

A specific cross-sectional structure of the second diffraction device 23 will be described with reference to FIG. 6B. The second reflection type diffraction element D2 or the reflection type diffraction layer 23b has the same structure as the first reflection type diffraction element D1 but has an inverted structure with respect to the Z direction. In other words, the second reflection type diffraction element D2 includes an R diffraction layer 42a that diffracts red R light, a G diffraction layer 42b that diffracts green G light, and a B diffraction layer 42c that diffracts blue B light as the three diffraction elements corresponding to the three colors. The R diffraction layer 42a diffracts the R component MLa of the imaging light ML, and forms a red wavelength region of the imaging light ML emitted outside or forward. The G diffraction layer 42b diffracts the G component MLb of the imaging light ML, and forms a green wavelength region of the imaging light ML emitted outside or forward. The B diffraction layer 42c diffracts the B component MLc of the imaging light ML, and forms a blue wavelength region of the imaging light ML emitted outside or forward. At this time, each of the RGB colors is diffracted in parallel with each other. Although not illustrated in the drawings, as a result of being reflected at different diffraction angles at each position in the vertical direction of the second reflection type diffraction element D2, each of the RGB light rays yielding the color dispersion described in FIG. 4 is returned to have the angular state prior to being incident on the first reflection type diffraction element D1 upon being emitted from each position in the vertical direction of the second reflection type diffraction element D2.

The R diffraction layer 42a, the G diffraction layer 42b, and the B diffraction layer 42c have higher transmittance by lowering the diffraction efficiency, such that the imaging light ML that is reflected by the concave transmission mirror 24 and returned to the second diffraction device 23 is transmitted through the second diffraction device 23 by approximately 50%. That is, the second reflection type diffraction element D2 has an equivalent structure in which a diffraction wavelength width thereof is equal to that of the first reflection type diffraction element D1, but the diffraction efficiency thereof is relatively lower than that of the first reflection type diffraction element D1.

The R diffraction layer 42a, the G diffraction layer 42b, and the B diffraction layer 42c are reflection type diffraction elements, respectively. They are individually manufactured as film-shaped optical elements, joined to each other and laminated, and attached to the outer side surface of the plate shaped body 23a as a whole. Each of the diffraction layers 42a, 42b, and 42c is, for example, a volume hologram element. Each of the diffraction layers 42a, 42b, and 42c has a diffraction pattern DP extending in the left-right X direction that is an intersecting direction orthogonal to the predetermined direction. A pitch of the diffraction pattern DP at the surface is constant with respect to the vertical Y direction, which is the predetermined direction. However, in order to diffract each of the RGB colors at the same angle, the pitch of the diffraction pattern DP is set to a different value for each diffraction layer 42a, 42b, and 42c. When each of the diffraction layers 42a, 42b, and 42c is a volume hologram element, the second reflection type diffraction element D2 or the reflection type diffraction layer 23b includes three diffraction layers 42a, 42b, 42c as three volume hologram layers corresponding to the three colors. The diffraction layers 42a, 42b, and 42c are produced by the same method as the diffraction layers 41a, 41b, and 41c of the first reflection type diffraction element D1.

The second reflection type diffraction element D2 need not have a three-layer structure including the R diffraction layer 42a, the G diffraction layer 42b, and the B diffraction layer 42c, but may be an element in which stripes that diffract the imaging light ML for each color of RGB may be collectively formed in a single layer.

Note that second the reflection type diffraction element D2 need not be formed directly at the plate shaped body 23a or directly affixed thereon. For example, the plate shaped body 23a may be coated with a hard coat film, and the reflection type diffraction layer 23b as the second reflection type diffraction element D2 may be formed or affixed thereon. Furthermore, the second reflection type diffraction element D2 may be embedded in the plate shaped body 23a.

Figure 7:
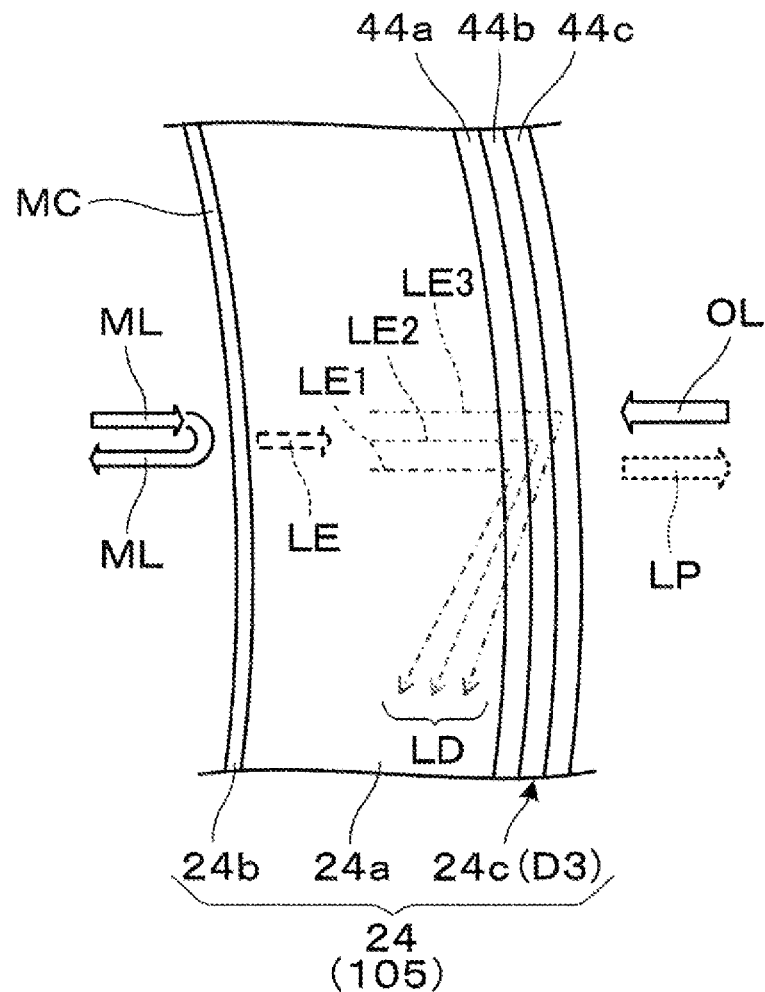
FIG. 7 is a diagram illustrating a structure, etc. of a concave transmission mirror including a third reflection type diffraction element.

Hereinafter, the structure of the concave transmission mirror 24 will be described below with reference to FIG. 7. The concave transmission mirror 24 includes the plate shaped body 24a that is a support for maintaining an overall shape, the partial reflection film 24b formed inside the plate shaped body 24a (the exit pupil EP side in FIG. 2), and the reflection type diffraction layer 24c formed on the external side of the plate shaped body 24a. The partial reflection film 24b functions as a partial reflection surface MC that is concave inside, and reflects the imaging light ML at a prescribed reflectance. At this time, the partial reflection film 24b reflects the imaging light ML of the visible wavelength region substantially uniformly regardless of the wavelength. As the third reflection type diffraction element D3 that is convex outward, the reflection type diffraction layer 24c diffracts leakage light LE, which is the imaging light ML that has been transmitted through the partial reflection film 24b, so that the leakage light LE is deviated from a linear optical path. The reflection type diffraction layer 24c is formed at a curved surface similar to the partial reflection film 24b. The plate shaped body 24a has a substantially uniform thickness. The reflection type diffraction layer 24c bends the imaging light ML or the leakage light LE so that the imaging light ML or the leakage light LE is deviated from the linear optical path passing through the concave transmission mirror 24. Deflecting the leakage light LE away from the linear optical path means that the optical path of the imaging light ML or the leakage light LE is directed in another direction so as not to travel in the front face direction of the external environment. The third reflection type diffraction element D3 can be utilized to bend the leakage light LE to reflect obliquely. When the leakage light LE is incident substantially perpendicularly on the third reflection type diffraction element D3, the angle by which the leakage light LE is bent is 90° or greater with respect to the original direction, but 135° or less from the original direction so as not to be close to specular reflection. Specifically, the reflection type diffraction layer 24c bends the imaging light ML or the leakage light LE so that they are reflected downward with respect to the linear optical path passing through the concave transmission mirror 24. Here, the "downward" refers to the inner side or the exit pupil EP side of the reflection type diffraction layer 24c in a conical region extending below 45° or less with respect to the lower side of the incident point or the −Y side, along an intersection line between the tangent plane of the reflection type diffraction layer 24c at the incident point of the leakage light LE and a surface parallel to the YZ plane. Diffraction light LD bent in the downward direction by the reflection type diffraction layer 24c propagates within the plate shaped body 24a of the concave transmission mirror 24 while being reflected by the outer side surface 24f or the inner side surface 24r, and is emitted from the end portion. Alternatively, the diffraction light LD is refracted by the outer side surface 24f or the inner side surface 24r of the concave transmission mirror 24 and is emitted to the outside. Meanwhile, the diffraction light LD emitted out of the concave transmission mirror 24 is attenuated by each portion of the concave transmission mirror 24, and the exit direction thereof does not have regularity that reflects the original imaging light ML. Accordingly, even in the presence of the leakage light LE, the situation can be avoided wherein the leakage light LE is diffracted by the reflection type diffraction layer 24c, and wherein the virtual image or real image that reflects the display image formed at the display surface 11a of the imaging light generation device 11 is formed, which is observable by a third party. If the reflection type diffraction layer 24c is not present, the leakage light LE of the imaging light ML travels through the concave transmission mirror 24 and is emitted to the external side, and a portion of the virtual image or real image that reflects the display image formed at the display surface 11a of the imaging light generation device 11 can be observed to a third party. Note that an absorbent material for absorbing the diffraction light LD can be applied or adhered to the edge of the lower end of the concave transmission mirror 24.

The reflection type diffraction layer 24c or the third reflection type diffraction element D3 includes an R diffraction layer 44a that diffracts red R light, a G diffraction layer 44b that diffracts green G light, and a B diffraction layer 44c that diffracts blue B light as the three diffraction elements corresponding to the three colors. The R diffraction layer 44a diffracts the R component LE1 of the leakage light LE, deviates the component from the original optical path, and forms a red wavelength region of the diffraction light LD emitted in the downward direction. The G diffraction layer 44b diffracts the G component LE2 of the leakage light LE, deviates the component from the original optical path, and forms a green wavelength region of the diffraction light LD emitted in the downward direction. The B diffraction layer 44c diffracts the B component LE3 of the leakage light LE, deviates the component from the original optical path, and forms a blue wavelength region of the diffraction light LD emitted in the downward direction. The R diffraction layer 44a, the G diffraction layer 44b, and the B diffraction layer 44c are reflection type diffraction elements, respectively. They are individually manufactured as film-shaped optical elements, joined to each other and laminated, and attached to the outer side surface 24f of the plate shaped body 24a as a whole to form the surface on the external side. Each of the diffraction layers 44a, 44b, and 44c is, for example, a volume hologram element. When each of the diffraction layers 44a, 44b, and 44c is a volume hologram element, the third reflection type diffraction element D3 includes three diffraction layers 44a, 44b, 44c as three volume hologram layers corresponding to the three colors. The diffraction layers 44a, 44b, and 44c that constitute the third reflection type diffraction element D3 can be produced by the same method as the diffraction layers 41a, 41b, and 41c that constitute the first reflection type diffraction element D1.

The diffraction wavelength width of the third reflection type diffraction element D3 is equal to or greater than the diffraction wavelength width of the first reflection type diffraction element D1 provided at the first diffraction device 22 and the diffraction wavelength width of the second reflection type diffraction element D2 provided at the second diffraction device 23. That is, the diffraction wavelength width of the first reflection type diffraction element D1 and the diffraction wavelength width of the second reflection type diffraction element D2 are equal to or smaller than the diffraction wavelength width of the third reflection type diffraction element D3. In this case, the imaging light ML diffracted by the first reflection type diffraction element D1 or the second reflection type diffraction element D2 can be all diffracted by the third reflection type diffraction element D3, whereby the information loss can be reliably prevented.

The third reflection type diffraction element D3 need not have a three-layer structure including the R diffraction layer 44a, the G diffraction layer 44b, and the B diffraction layer 44c, but may be an element in which stripes that diffract the imaging light ML or the leakage light LE for each color of RGB may be collectively formed in a single layer. In this manner, when the RGB imaging light ML or the leakage light LE is diffracted in a single layer, it is expected that the diffraction efficiency is reduced and some drop light is generated at the peak wavelength compared to a case where the three diffraction layers 44a, 44b, 44c are incorporated therein. However, when the light intensity of such drop light is not large, it will not be easy for the third party to observe the image in the display. Conversely, the third reflection type diffraction element D3 may have a multilayer structure with three or more layers. For example, in addition to the diffraction layers 44a, 44b, 44c described above, a fourth diffraction layer that diffracts the imaging light ML in the wavelength region between RG and a fifth diffraction layer that diffracts the imaging light ML in the wavelength region between GB can be added to obtain a third reflection type diffraction element D3 having a five-layer structure.

In the above, the reflection type diffraction layer 24c is configured to propagate the imaging light ML or the leakage light LE to be reflected or bent downward so that the imaging light ML or the leakage light LE is deviated from the linear optical path passing through the concave transmission mirror 24. Meanwhile, the imaging light ML or the leakage light LE may be propagated to be reflected or bent upward from the original optical path. Here, the "upward" refers to the inner side or the exit pupil EP side of the reflection type diffraction layer 24c in a conical region extending above 45° or less with respect to the upper side of the incident point or the +Y side, along an intersection line between the tangent plane of 24c at the incident point of the leakage light LE and a surface parallel to the YZ plane. In this case, an absorbent material for absorbing the diffraction light LD can be applied or adhered to the edge of the upper end of the concave transmission mirror 24. The three diffraction layers 44a, 44b, and 44c need not diffract each color light of RGB in the same direction. One of the colors may be diffracted upward and the remaining color may be diffracted downward. The three diffraction layers 44a, 44b, and 44c need not have the same diffraction efficiency. For example, the G diffraction layer 42b having a high relative luminous efficiency can be relatively increased in diffraction efficiency.

The reflection type diffraction layer 24c may propagate the imaging light ML or the leakage light LE to be reflected or bent in the left-right lateral direction or the oblique direction of the concave transmission mirror 24. Here, the "lateral direction" refers to the inner side or the exit pupil EP side of the reflection type diffraction layer 24c in a conical region within 45° or less with respect to the ±X side of the incident point, along an intersection line between the tangent plane of the reflection type diffraction layer 24c at the incident point of the leakage light LE and a surface parallel to the YZ plane. In this case, an absorbent material for absorbing the diffraction light LD can be applied or adhered to the edge of the right end or the left end of the concave transmission mirror 24. However, when the diffraction angle of the leakage light LE increases in the lateral direction, the proportion of the diffraction light LD emitted from the inner surface of the concave transmission mirror 24 toward the side of the concave transmission mirror 24 is increased. To avoid this, it may also be desirable to provide a light shielding member that overhangs the face side at the left and right ends of the concave transmission mirror 24 so that the virtual image cannot be observed by the third party located on the side of the wearer US. Note that the oblique direction refers to the intermediate direction between the lateral direction and the vertical direction. The oblique direction refers to, for example, the inner side or the exit pupil EP side of the reflection type diffraction layer 24c in an intermediate direction between the +X direction and the +Y direction, and in a conical region within 45° of the intermediate direction.

Note that the curvature may be different for the first diffraction device 22 and the second diffraction device 23 in the horizontal XZ cross section. That is, the curvature of the inner concave cylindrical surface at which the first reflection type diffraction element D1 is formed may be different from the curvature of the outer convex cylindrical surface at which the second reflection type diffraction element D2 is formed. In this case, the partial reflection surface MC of the concave transmission mirror 24 has a different curvature in the vertical and horizontal manner so that focal points thereof are matched with respect to the horizontal X direction and the vertical Y direction. Further, in order to adjust the difference between the imaging magnification in the vertical and horizontal directions, an image formed at the display surface 11a of the imaging light generation device 11 is subjected to image processing taking into account the imaging magnification in the vertical and horizontal directions.

Figure 2:
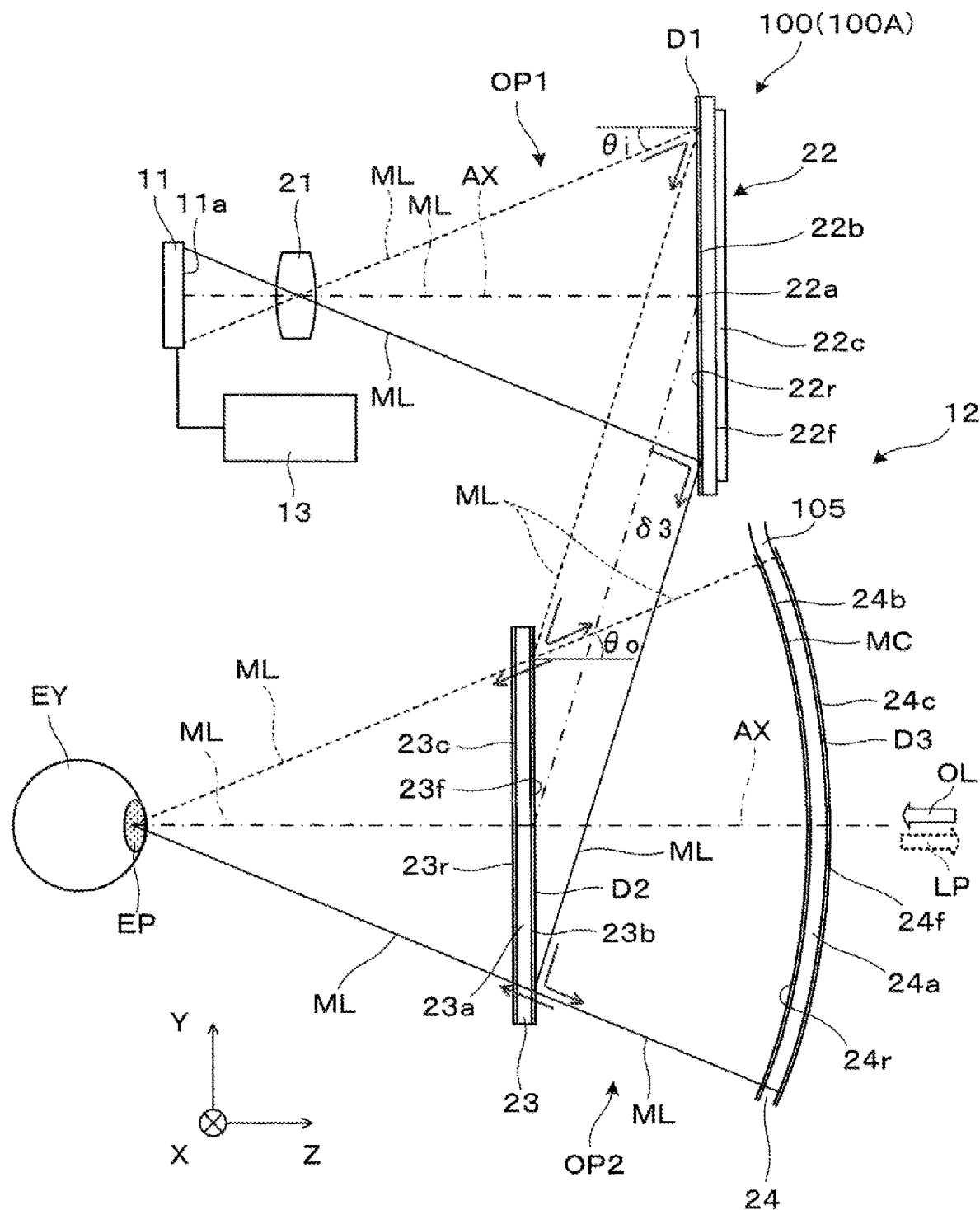
FIG. 2 is a side cross-sectional view illustrating the virtual image display device of FIG. 1.
Figure 8A:
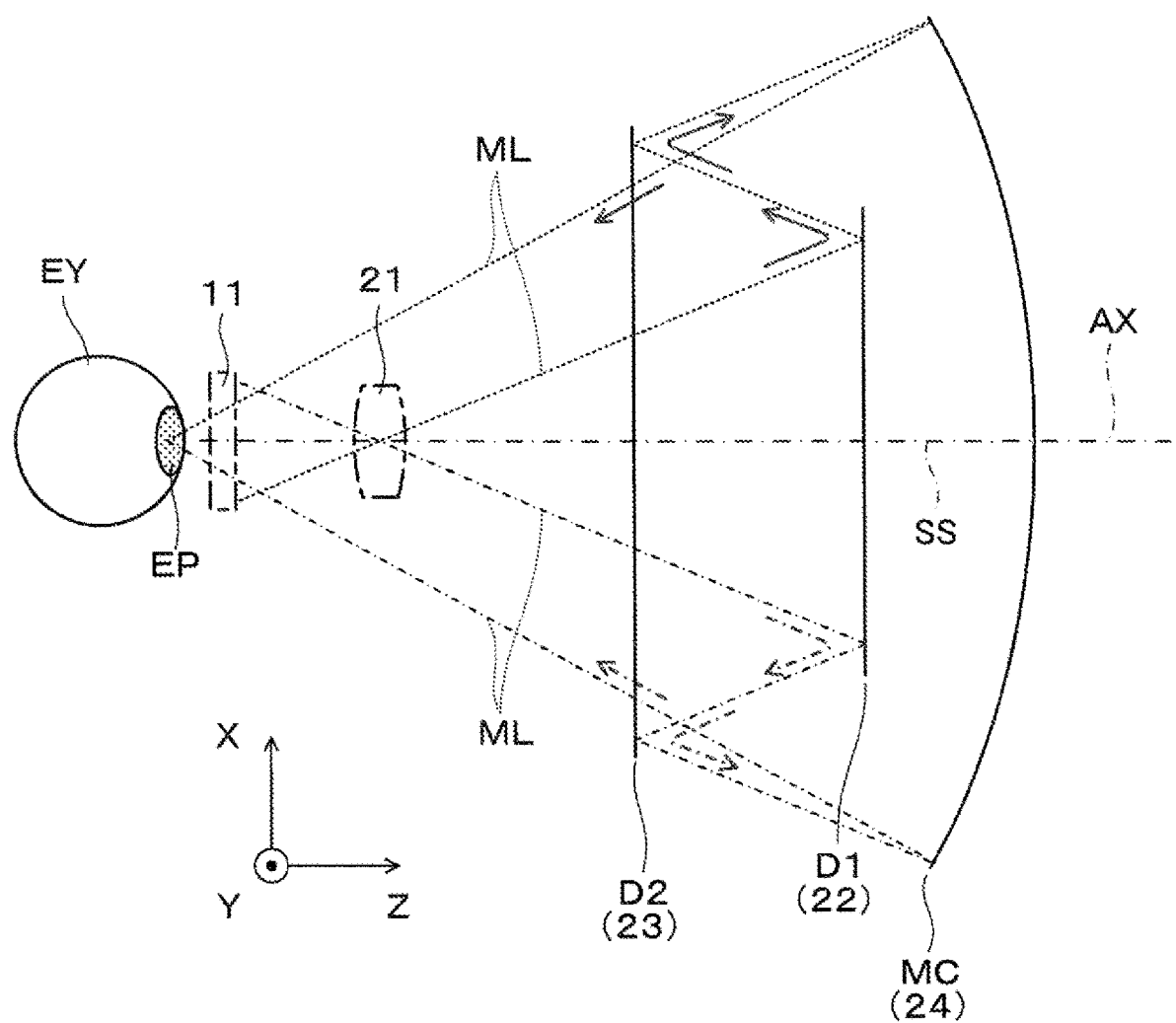
FIG. 8A is a flat surface cross-sectional view illustrating a virtual image display device of a modification example.
Figure 8B:
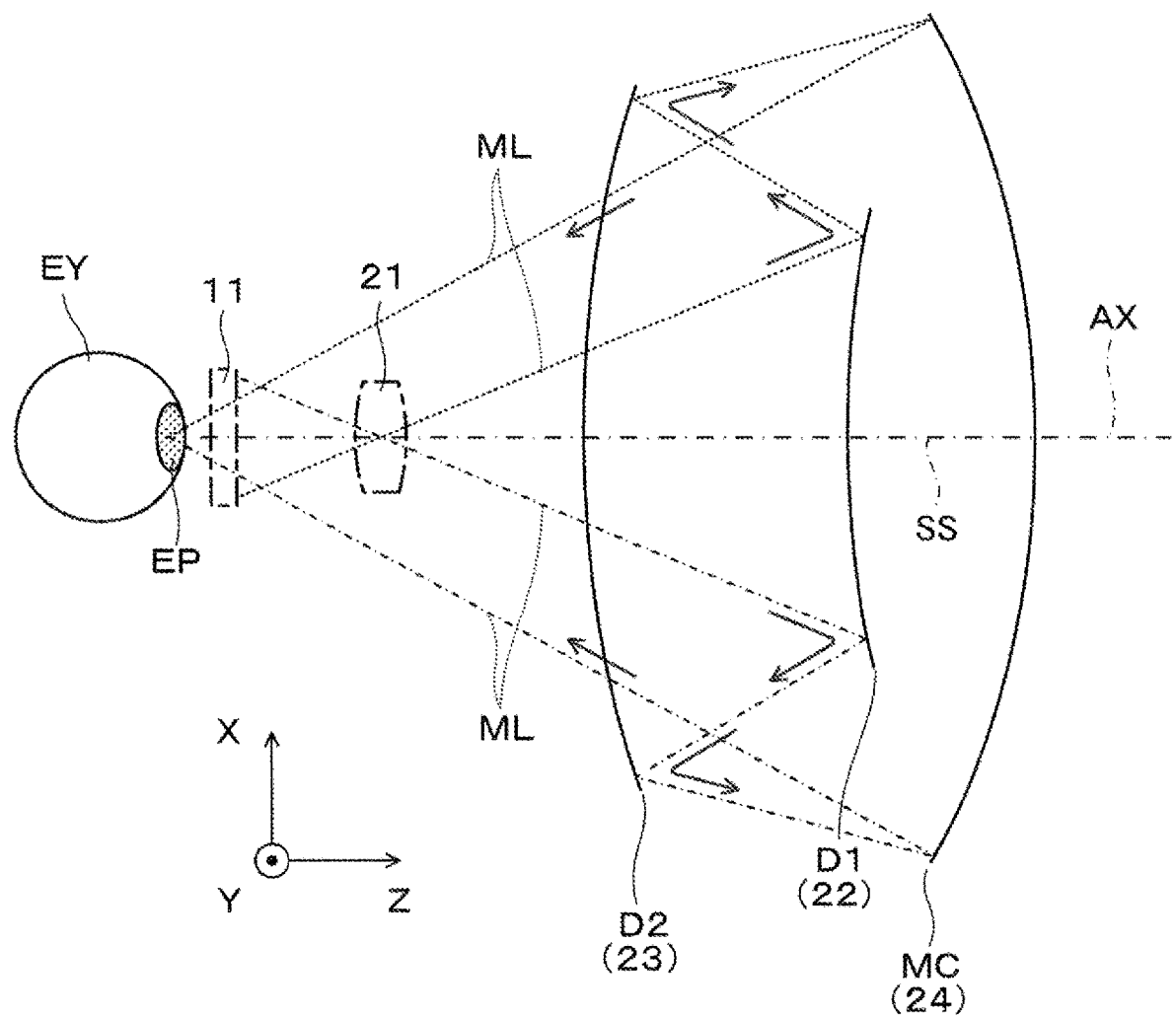
FIG. 8B is a flat surface cross-sectional view illustrating the virtual image display device of the modification example.

FIGS. 8A and 8B are diagrams illustrating a modification example of the optical unit 12 illustrated in FIG. 2. In the example illustrated in FIG. 8A, the first reflection type diffraction element D1 and the second reflection type diffraction element D2 are formed along a flat surface. In the example illustrated in FIG. 8B, the first reflection type diffraction element D1 is formed along a cylindrical surface curved to be convex inside, and the second reflection type diffraction element D2 is formed along a cylindrical surface curved to be concave outside. In the above case, the partial reflection surface MC of the concave transmission mirror 24 has a different curvature in the vertical and horizontal manner so that focal points thereof are matched with respect to the horizontal X direction and the vertical Y direction. In order to adjust the difference between the imaging magnification in the vertical and horizontal directions, an image formed at the display surface 11a of the imaging light generation device 11 is subjected to image processing taking into account the imaging magnification in the vertical and horizontal directions.

Although not illustrated, a combination may be available such that the first reflection type diffraction element D1 is formed along a cylindrical surface curved to be convex inside, and the second reflection type diffraction element D2 is formed along a cylindrical surface curved to be convex outside.

Figure 9:
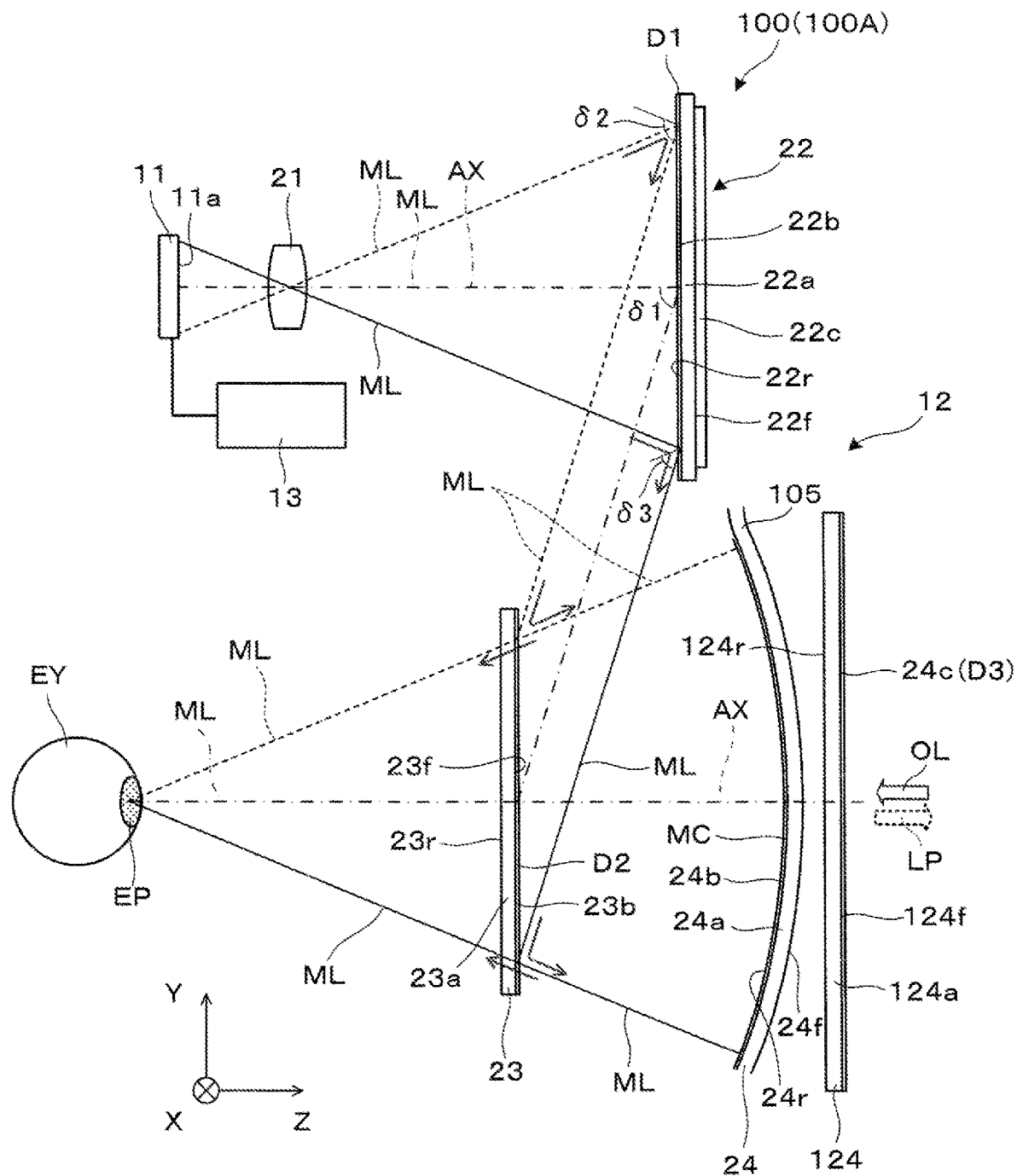
FIG. 9 is a side cross-sectional view illustrating the virtual image display device of the modification example.

FIG. 9 is a diagram illustrating another modification example of the optical unit 12 illustrated in FIG. 2. In this case, a cover 124 may be disposed at the front face of the concave transmission mirror 24, and the reflection type diffraction layer 24c, which is the third reflection type diffraction element D3, is formed at the cover 124 rather than the concave transmission mirror 24. In other words, the third reflection type diffraction element D3 is formed at the cover 124 disposed on the external side of the concave transmission mirror 24. Forming the third reflection type diffraction element D3 on the cover 124 facilitates manufacturing and incorporation of the third reflection type diffraction element D3. The third reflection type diffraction element D3 or the reflection type diffraction layer 24c may be formed at the outer side surface 124f of the plate shaped body 124a as illustrated, but may be formed at the inner side surface 124r. When the reflection type diffraction layer 24c is formed at the outer side surface 124f, an antireflection film can be formed at the inner side surface 124r. When the reflection type diffraction layer 24c is formed at the inner side surface 124r, an antireflection film can be formed at the outer side surface 124f. Note that the cover 124 can be a shade detachable to the outer frame of the display driving unit 102 illustrated in FIG. 1. At this time, the plate shaped body 124a can be formed from a light-absorbing material that disperses or contains a light-absorbing material, for example.

As described above, according to the virtual image display device 100 of the first exemplary embodiment, the second reflection type diffraction element D2 diffracts the imaging light ML from the first reflection type diffraction element D1 in the downward direction so that the imaging light ML is compensated for the wavelength dispersion. Therefore, the optical path that is virtually developed from the optical path facing the first reflection type diffraction element D1 can be shifted in a direction perpendicular to the optical axis AX so that the optical path faces the second reflection type diffraction element D2. Further, the weight of the optical system of the virtual image display device 100 can be reduced compared to a case where the prism member is used in place of a pair of the reflection type diffraction elements D1 and D2 while reducing the thickness in the front-rear Z direction of the optical system. Furthermore, the third reflection type diffraction element D3 diffracts the imaging light ML so that the imaging light ML is deviated from the optical path passing through the concave transmission mirror 24, whereby the imaging light ML emitted to the external side transmitted through the partial reflection film 24b can be suppressed, and the image in the display is made less visible from the outside, and the effect of suppressing information loss increases.

Second Exemplary Embodiment

Hereinafter, a virtual image display device according to a second exemplary embodiment will be described. Note that the virtual image display device according the second exemplary embodiment is obtained by modifying a part of the virtual image display device according to the first exemplary embodiment, and description on common portions is omitted.

Figure 10:
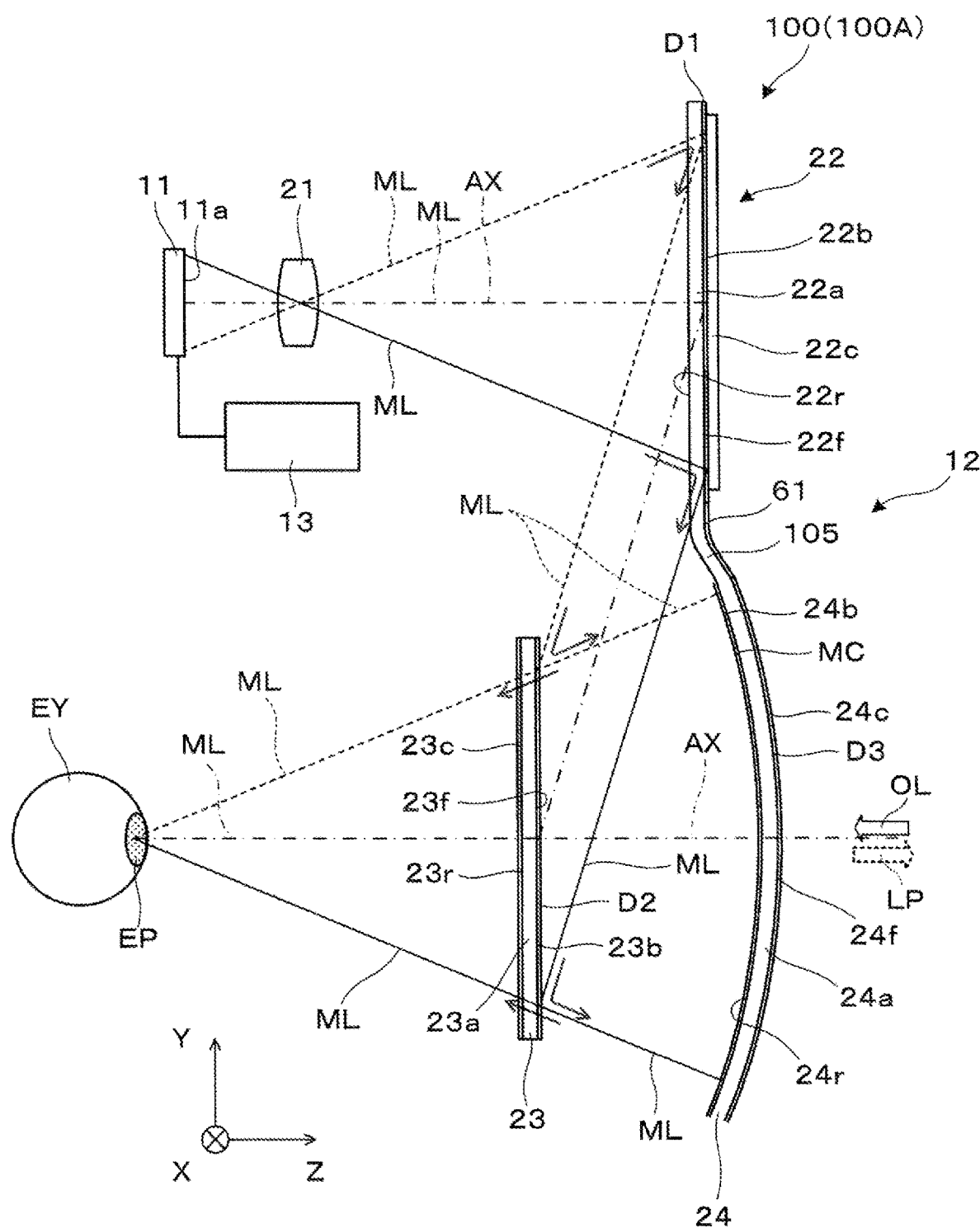
FIG. 10 is a side cross-sectional view illustrating a device of a second exemplary embodiment.

FIG. 10 is a side cross-sectional view illustrating a virtual image display device 100 of the second exemplary embodiment. In this case, the plate shaped body 24a, which is a support for the concave transmission mirror 24, is extended to form a support for the first reflection type diffraction element D1. In other words, the first reflection type diffraction element D1 and the third reflection type diffraction element D3 are formed at the plate shaped body 24a that is a common support. Furthermore, the first reflection type diffraction element D1 and the third reflection type diffraction element D3 are integrally formed to be a sheet-shaped member 61. In other words, the first reflection type diffraction element D1 is formed on an external side of the plate shaped body 24a, and the light-absorbing member 22c is provided to be attached to the first reflection type diffraction element D1. In this case, the first reflection type diffraction element D1 can be a component associated with the concave transmission mirror 24, whereby the structure of the virtual image display device 100 can be simplified.

In the case of a structure such as that of the present exemplary embodiment, the first reflection type diffraction element D1 and the third reflection type diffraction element D3 can be formed collectively as the sheet-shaped member 61. That is, the first reflection type diffraction element D1 and the third reflection type diffraction element D3 can be a volume hologram produced via the same exposure step, whereby the exposure process can be simplified and the diffraction wavelength width of the first reflection type diffraction element D1 and the diffraction wavelength width of the third reflection type diffraction element D3 can be made substantially the same.

Third Exemplary Embodiment

Hereinafter, a virtual image display device according to a third exemplary embodiment will be described. Note that the virtual image display device according the third exemplary embodiment is obtained by modifying a part of the virtual image display device according to the second exemplary embodiment or the first exemplary embodiment, and description on common portions is omitted.

Figure 11:
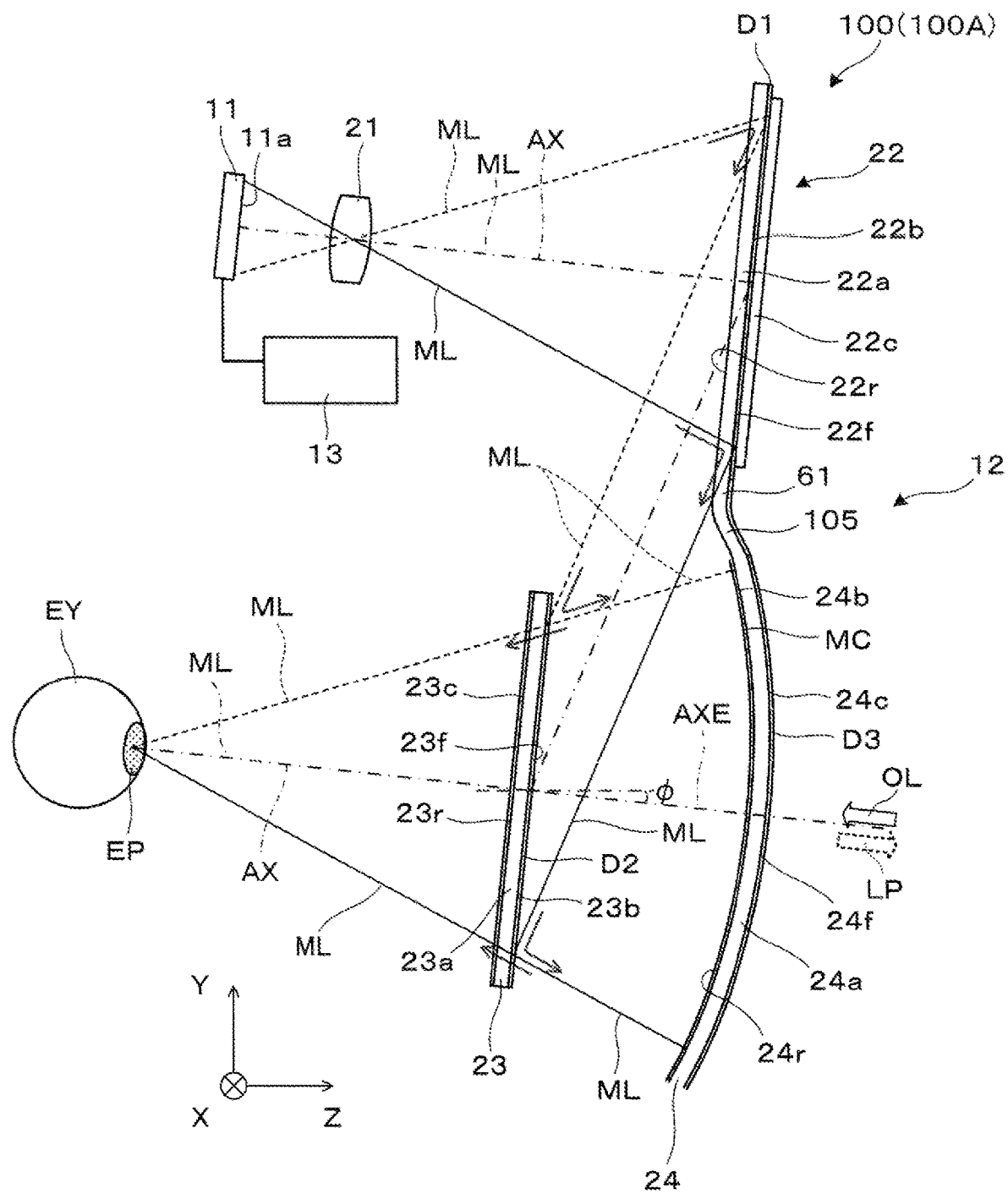
FIG. 11 is a side cross-sectional view illustrating a device of a third exemplary embodiment.

FIG. 11 is a side cross-sectional view illustrating a virtual image display device 100 of the third exemplary embodiment. In this case, the optical axis AX from the exit pupil EP through the second diffraction device 23 toward the concave transmission mirror 24, that is, an exit optical axis AXE, extends inclinedly downward with a tilt angle φ=10° with respect to the forward +Z direction. The exit optical axis AXE is an axis derived from the shape symmetry of the concave transmission mirror 24. By setting the exit optical axis AXE downward to approximately 10° on the front side with respect to the Z-axis, which is the horizontal axis, the fatigue of the wearer US with the eye EY, observing the virtual image, can be reduced.

Fourth Exemplary Embodiment

Hereinafter, a virtual image display device according to a fourth exemplary embodiment will be described. Note that the virtual image display device according the fourth exemplary embodiment is obtained by modifying a part of the virtual image display device according to the first exemplary embodiment, and description on common portions is omitted.

Figure 12:
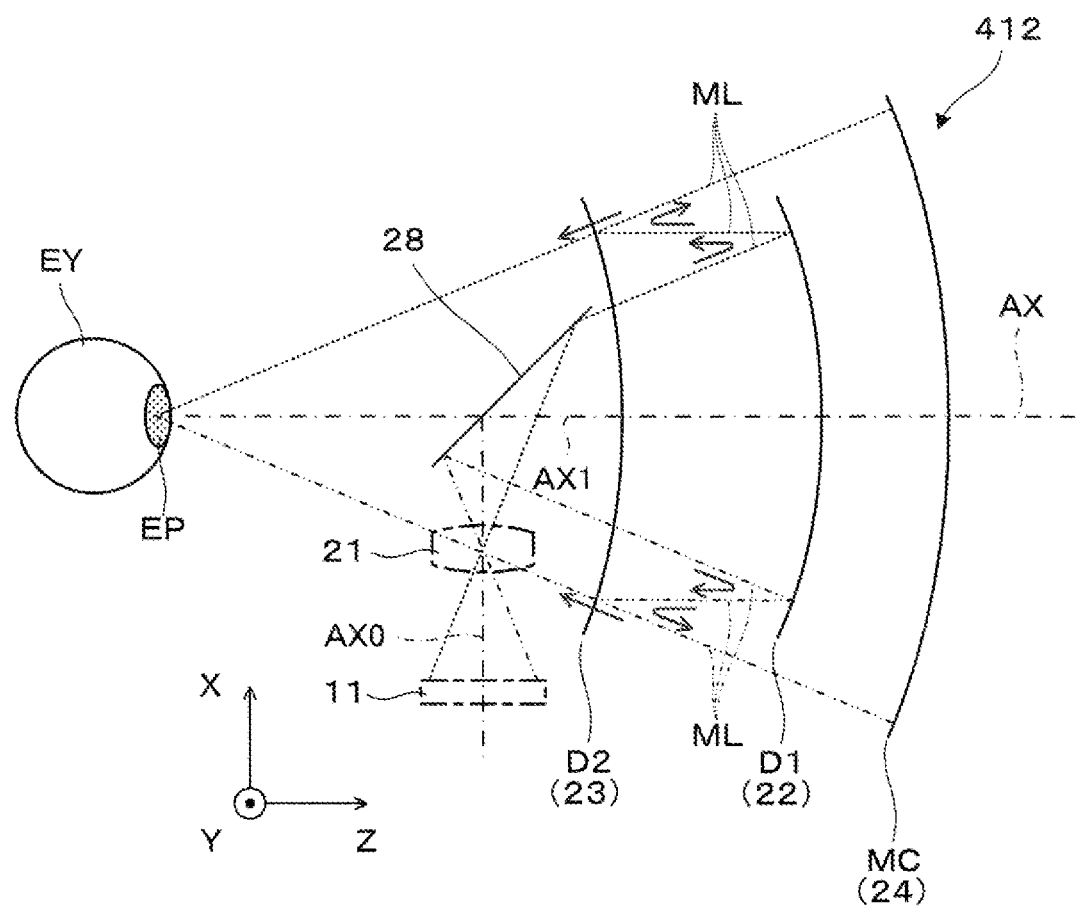
FIG. 12 is a perspective view illustrating a device of the fourth exemplary embodiment.

A virtual image display device according to the fourth exemplary embodiment will be described with reference to FIG. 12. FIG. 12 is a flat surface cross-sectional view corresponding to FIG. 3. The optical unit 412 includes the projection lens 21, a folding mirror 28, the first diffraction device 22, the second diffraction device 23, and the concave transmission mirror 24. In other words, the folding mirror 28 is disposed between the projection lens 21 and the first diffraction device 22.

The folding mirror 28 reflects the imaging light ML from the projection lens 21 in the intersecting direction. A projection optical axis AX0, which is an optical axis of the projection lens 21, extends parallel to the horizontal X-axis direction. The optical path is bent along a reflected optical axis AX1 from the projection optical axis AX0 by the folding mirror 28. The reflected optical axis AX1 coincides with the optical axis AX of the first diffraction device 22 extending in the front-rear Z direction. In the optical unit 412, the first diffraction device 22, the second diffraction device 23, the concave transmission mirror 24, etc. are the same as those illustrated in FIG. 2.

Fifth Exemplary Embodiment

Hereinafter, a virtual image display device according to a fifth exemplary embodiment will be described. Note that the virtual image display device according the fifth exemplary embodiment is obtained by modifying a part of the virtual image display device according to the first exemplary embodiment, and description on common portions is omitted.

Figure 13:
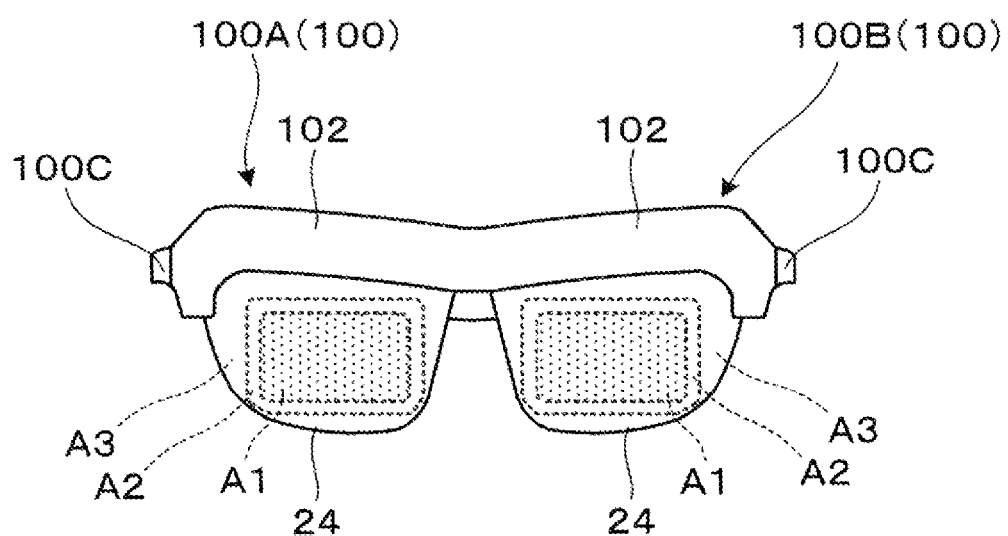
FIG. 13 is a front view illustrating a virtual image display device of a fifth exemplary embodiment.

Referring to FIG. 13, in the present exemplary embodiment, the partial reflection surface MC and the third reflection diffraction element D3 can be formed in a localized effective region λ1 of the concave transmission mirror 24 or the appearance member 105. For regions λ2, λ3 around the effective region λ1, a reflectance transition region can be formed with gradually decreasing the reflectance of the imaging light ML with respect to the partial reflection surface MC. Thus a transition region in which the diffraction efficiency of the imaging light ML gradually decreases with respect to the third reflection diffraction element D3 can be formed.

Modification Examples and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

The plate shaped body 24a that constitutes the concave transmission mirror 24 is not limited to a resin material, and may be formed from glass, synthetic quartz, or a composite of these material and a resin material.

The first reflection type diffraction element D1 and the second reflection type diffraction element D2 can be fabricated from surface relief diffraction elements, without being limited to a volume hologram layer. The third reflection type diffraction element D3 can also be fabricated from surface relief diffraction elements, without being limited to a volume hologram layer.

A virtual image display device according to a specific aspect includes an imaging light generation device, a first reflection type diffraction element configured to diffract imaging light from the imaging light generation device in a predetermined direction, a second reflection type diffraction element configured to diffract the imaging light from the first reflection type diffraction element in the predetermined direction so that the imaging light is compensated for wavelength distribution, and a concave transmission mirror including a partial reflection film, the concave transmission mirror being configured to reflect the imaging light diffracted from the second reflection type diffraction element toward the second reflection type diffraction element by the partial reflection film.

In the above-described virtual image display device, the second reflection type diffraction element diffracts the imaging light ML from the first reflection type diffraction element in the predetermined direction so that the imaging light is compensated for the wavelength dispersion. Therefore, the optical path that is virtually developed from the optical path facing the first reflection type diffraction element can be shifted in a direction perpendicular to the optical axis so that the optical path faces the second reflection type diffraction element, and the weight of the optical system can be reduced compared to a case where the prism member is used in place of a pair of the reflection type diffraction elements while reducing the thickness in the front-rear direction of the optical system.

In a specific aspect, the first reflection type diffraction element is configured to utilize a wavelength shift in a wavelength region of a specific color that constitutes the imaging light to uniformly diffract the imaging light in the predetermined direction, and the second reflection type diffraction element is configured to utilize the wavelength shift in the wavelength region of the specific color to diffract the imaging light so that an incident angle to the first reflection type diffraction element is restored.

In another aspect, in accordance with a position of the imaging light generation device with respect to the predetermined direction, the first reflection type diffraction element is configured to reflect the imaging light so that incident light of the imaging light becomes mutually parallel exit light by reflecting a wavelength shift, the incident light being incident on the first reflection type diffraction element.

In yet another aspect, the first reflection type diffraction element and the second reflection type diffraction element include a diffraction pattern extending in an intersecting direction orthogonal to the predetermined direction, and a pitch of the diffraction pattern on a surface is constant with respect to the predetermined direction.

In yet another aspect, the first reflection type diffraction element and the second reflection type diffraction element are disposed in parallel at a reference plane through which an optical axis passes.

In yet another aspect, the first reflection type diffraction element and the second reflection type diffraction element include different refractive powers with different signs in an intersecting direction orthogonal to the predetermined direction, the first reflection type diffraction element and the second reflection type diffraction element being configured to return the imaging light incident on the first reflection type diffraction element to have an original angle when emitted from the second reflection type diffraction element. In this case, the optical path can be shifted by two diffraction in the predetermined direction, and the optical path can be shifted by two reflections in the intersecting direction.

In yet another aspect, provided is a light-absorbing member disposed at a back face of the first reflection type diffraction element, the light-absorbing member being configured to absorb transmitted light from the first reflection type diffraction element. In this case, the transmitted light that that has not diffracted by the first reflection type diffraction element can be prevented from being emitted to the external side.

In yet another aspect, provided is a third reflection type diffraction element disposed on an external side of the partial reflection film, the third reflection type diffraction element being configured to diffract the imaging light so that the imaging light is deviated from an optical path passing through the concave transmission mirror. In this case, the third reflection type diffraction element diffracts the imaging light so that the imaging light is deviated from the optical path passing through the concave transmission mirror, whereby the imaging light emitted to the external side transmitted through the partial reflection film can be suppressed, and the image in the display is made less visible from the outside, and the effect of suppressing information loss increases.

In yet another aspect, the third reflection type diffraction element diffracts the imaging light upward or downward. A situation where the third party is present above or below the virtual image display device is unlikely to occur, and the light shielding member is easily disposed above or below the virtual image display device 100, whereby the effect of suppressing information loss can be further enhanced.

In yet another aspect, the imaging light generation device is configured to form the imaging light including three colors, and the first reflection type diffraction element and the second reflection type diffraction element each include a three-volume hologram layer corresponding to the three colors. In this case, the diffraction efficiency for each three colors can be increased, and loss in the first reflection type diffraction element or the second reflection type diffraction element can be suppressed.

In yet another aspect, the diffraction wavelength width of the first reflection type diffraction element and the diffraction wavelength width of the second reflection type diffraction element are equal to or smaller than the diffraction wavelength width of the third reflection type diffraction element.

In yet another aspect, the concave transmission mirror is formed at a support having optical transparency, and the first reflection type diffraction element and the third reflection type diffraction element are formed at the support. In this case, the first reflection type diffraction element can be a component associated with the concave transmission mirror, whereby the structure of the virtual image display device can be simplified.

In yet another aspect, the first reflection type diffraction element and the third reflection type diffraction element are integrally formed to be a sheet-shaped member. In this case, the first reflection type diffraction element and the third reflection type diffraction element can be produced as a part.

In yet another aspect, the concave transmission mirror reflects the imaging light to collect the imaging light into the exit pupil.

An optical unit according to a specific aspect includes a first reflection type diffraction element configured to diffract imaging light in a predetermined direction, a second reflection type diffraction element configured to diffract the imaging light from the first reflection type diffraction element in the predetermined direction so that the imaging light is compensated for wavelength distribution, and a concave transmission mirror configured to reflect the imaging light diffracted from the second reflection type diffraction element toward the second reflection type diffraction element by the partial reflection film.

What is claimed is:

1. A virtual image display device comprising:
    an imaging light generation device that generates an imaging light;
    a first reflection type diffraction element that diffracts the imaging light from the imaging light generation device;
    a second reflection type diffraction element that diffracts the imaging light from the first reflection type diffraction element so that the imaging light reflected by the first reflection type diffraction element is compensated for wavelength distribution; and
    a mirror that has a concave shape and that includes a reflection film reflecting a part of the imaging light and transmitting other part of the imaging light,
    wherein
    the second reflection type diffraction element diffracts the imaging light toward the mirror and transmits the part of the imaging light reflected by the mirror.

2. The virtual image display device according to claim 1, wherein
    the first reflection type diffraction element diffracts the imaging light so that the imaging light is generated a wavelength shift in a wavelength region of a specific color
    the second reflection type diffraction element diffracts the imaging light so that the imaging light is restored the wavelength shift in the wavelength region of the specific color generated by the first reflection type diffraction element.

3. The virtual image display device according to claim 2, wherein
    the first reflection type diffraction element diffracts the imaging light based on the wavelength shift in the wavelength region of the specific color so that the imaging light becomes a parallel light.

4. The virtual image display device according to claim 1, wherein
    the first reflection type diffraction element includes:
        a diffraction pattern extending a direction in which a diffraction of the second reflection type diffraction element extends,
    a pitch of the diffraction pattern being constant.

5. The virtual image display device according to claim 1, wherein
    the first reflection type diffraction element and the second reflection type diffraction element are disposed in parallel at a reference plane through which an optical axis extends.

6. The virtual image display device according to claim 1, wherein
    the first reflection type diffraction element has refractive power that is different from refractive power of the second reflection type diffraction element.

7. The virtual image display device according to claim 1, further comprising
a light-absorbing member that is disposed at a back face of the first reflection type diffraction element, the light-absorbing member that absorbs the imaging light passed through the first reflection type diffraction element.

8. The virtual image display device according to claim 1, further comprising
a third reflection type diffraction element that diffracts the imaging light from the second reflection type diffraction element toward a direction that is different from the direction in which an optical path passing through the concave transmission mirror.

9. The virtual image display device according to claim 8, wherein
the third reflection type diffraction element diffracts the imaging light toward upward or downward.

10. The virtual image display device according to claim 8, wherein
each of a diffraction wavelength width of the first reflection type diffraction element and a diffraction wavelength width of the second reflection type diffraction element is equal to or smaller than a diffraction wavelength width of the third reflection type diffraction element.

11. The virtual image display device according to claim 1, wherein
the imaging light generation device the imaging light including three colors, and each of the first reflection type diffraction element and the second reflection type diffraction element include a hologram layer corresponding to the three colors.

12. The virtual image display device according to claim 1, wherein
the mirror includes a support that transmits a part of the imaging light and that includes the first reflection type diffraction element and the third reflection type diffraction element.

13. The virtual image display device according to claim 12, wherein
the first reflection type diffraction element is a sheet shape member integrated with the third reflection type diffraction element.

14. The virtual image display device according to claim 1, wherein
the mirror reflects the imaging light to collect the imaging light into an exit pupil.

15. An optical unit comprising:
a first reflection type diffraction element that diffracts an imaging light;
a second reflection type diffraction element that diffracts the imaging light from the first reflection type diffraction element so that the imaging light reflected by the first reflection type diffraction element is compensated for wavelength distribution; and
a mirror that has a concave shape and that includes a reflection film reflecting a part of the imaging light and transmitting other part of the imaging light,
wherein
the second reflection type diffraction element diffracts the imaging light toward the mirror and transmits the part of the imaging light reflected by the mirror.

* * * * *